US012701416B2

(12) United States Patent (10) Patent No.: US 12,701,416 B2

Lei et al. (45) Date of Patent: Aug. 4, 2026

(54) COMMUNICATION METHOD, APPARATUS, AND SYSTEM

(71) Applicant: HUAWEI TECHNOLOGIES CO., LTD., Shenzhen (CN)

(72) Inventors: Ao Lei, Beijing (CN); He Li, Shanghai (CN); Yizhuang Wu, Beijing (CN); Rong Wu, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 508 days.

(21) Appl. No.: 18/163,938

(22) Filed: Feb. 3, 2023

(65) Prior Publication Data

US 2023/0188993 A1 Jun. 15, 2023

Related U.S. Application Data

(63) Continuation of application No. PCT/CN2020/107567, filed on Aug. 6, 2020.

(51) Int. Cl.
*H04W 12/08* (2021.01)
*H04W 76/14* (2018.01)

(52) U.S. Cl.
CPC ........... *H04W 12/08* (2013.01); *H04W 76/14* (2018.02)

(58) Field of Classification Search
CPC ..... H04W 12/08; H04W 76/14; H04W 12/37; H04W 4/40; H04L 63/205

(Continued)

(56) References Cited

U.S. PATENT DOCUMENTS

2017/0118637 A1* 4/2017 Peng ..................... H04L 63/205
2019/0394816 A1* 12/2019 Kim ..................... H04W 76/10

(Continued)

FOREIGN PATENT DOCUMENTS

CN 107637105 A 1/2018
CN 107682847 A 2/2018

OTHER PUBLICATIONS

Huawei et al, "KI#1 #7 sol#18: update to support ProSe restricted discovery and event based ProSe direct discovery charging", SA WG2 Meeting #139E e-meeting S2-2004721, Jun. 1, 2020, total 10 pages.

(Continued)

*Primary Examiner* — Hirdepal Singh

(57) ABSTRACT

Embodiments of the present disclosure provide a communication method and an apparatus to resolve a PC5 unicast establishment failure due to inconsistency between security parameters of terminal devices in a V2X scenario with security negotiation introduced into a PC5 unicast establishment procedure. The communication method includes: A first direct communication discovery name management function network element obtains a security parameter of a first terminal device. The security parameter of the first terminal device is required for establishing a PC5 connection between the first terminal device and a second terminal device. The first direct communication discovery name management function network element receives a security parameter of the second terminal device from a second direct communication discovery name management function network element and determines, based on whether the security parameter of the first terminal device matches the security parameter of the second terminal device, whether the first terminal device and the second terminal device support mutual communication.

20 Claims, 8 Drawing Sheets

(58) Field of Classification Search
USPC .......................................................... 455/410
See application file for complete search history.

(56) References Cited

U.S. PATENT DOCUMENTS

| 2020/0221298 | A1* | 7/2020 | Pan | H04W 12/50 |
| 2020/0336902 | A1* | 10/2020 | Wang | H04W 12/30 |
| 2022/0225448 | A1* | 7/2022 | Li | H04B 7/15 |
| 2023/0042442 | A1* | 2/2023 | Kim | H04L 63/0876 |
| 2023/0109855 | A1* | 4/2023 | Chun | H04W 4/42 |
| | | | | 370/329 |

OTHER PUBLICATIONS

3gpp.org, "3rd Generation Partnership Project Technical Specification Group Services and System Aspects Study on system enhancement for Proximity based Services (ProSe) in the 5G System (5GS)(Release 17)", 3GPP TR 23.752 V0.4.0, Jun. 30, 2020,total 121 pages.

Huawei et al, "KI#4 Sol#9 Update for Connection establishment via UE-to-UE Layer-2 Relay", 3GPP TSG-WG SA2 Meeting #139E e-meeting S2-2004022, Jun. 12, 2020,total 4 pages.
3GPP TS 23.303 V15.1.0 (Jun. 2018), 3rd Generation Partnership Project; Technical Specification Group Services and System Aspects; Proximity-based services (ProSe); Stage 2(Release 15), 130 pages.
3GPP TS 33.536 v16.0.0:"3rd Generation Partnership Project;Technical Specification Group Services and System Aspects;Security aspects of 3GPP support for advanced Vehicle-to-Everything (V2X) services(Release 16)",Jul. 2020,23 pages.
3GPP TS 23.501 V16.5.1 (Aug. 2020), 3rd Generation Partnership Project; Technical Specification Group Services and System Aspects; System architecture for the 5G System (5GS); Stage 2(Release 16), 440 pages.
Huawei et al.: "KI#1,#7, sol#18: update to support ProSe restricted discovery and event based ProSe direct discovery charging", 3GPP Draft; S2-2004016, 2020-05-22, XP051890023, total 8 pages.
3GPP Standard; 3GPP TR 33.833, V1.8.0, "3rd Generation Partnership Project; Technical Specification Group Services and System Aspects; Study on Security issues to support Proximity Services (ProSe) (Release 13)", Nov. 24, 2016, pp. 1-227, XP051229832.
Extended European Search Report issued in EP20948467.4, dated Jul. 11, 2023, 6 pages.

* cited by examiner

10

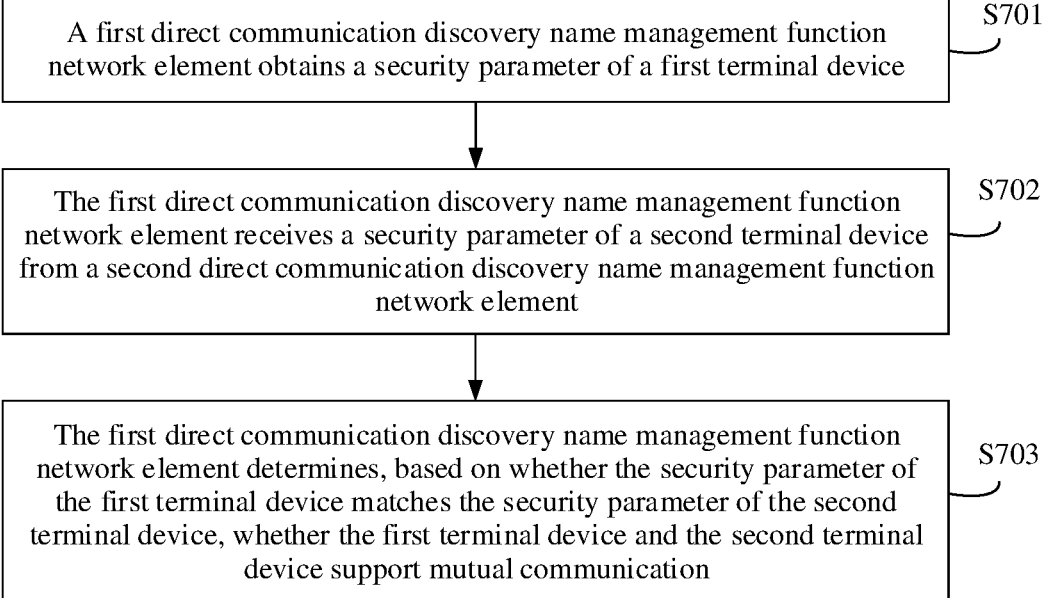

| | |
|---|---|
| A first direct communication discovery name management function network element obtains a security parameter of a first terminal device | S701 |
| The first direct communication discovery name management function network element receives a security parameter of a second terminal device from a second direct communication discovery name management function network element | S702 |
| The first direct communication discovery name management function network element determines, based on whether the security parameter of the first terminal device matches the security parameter of the second terminal device, whether the first terminal device and the second terminal device support mutual communication | S703 |

FIG. 7

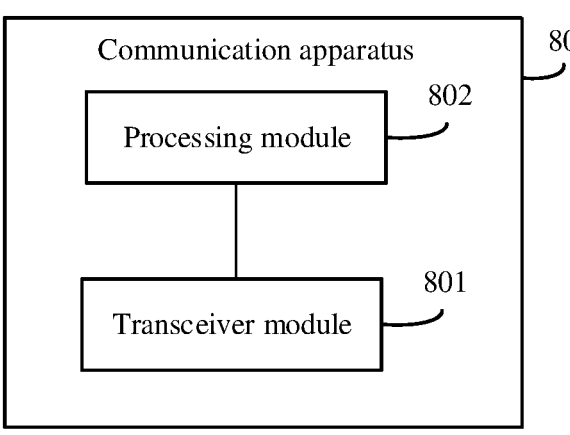

FIG. 8

COMMUNICATION METHOD, APPARATUS, AND SYSTEM

CROSS-REFERENCE TO RELATED APPLICATIONS

This application is a continuation of International Application No. PCT/CN2020/107567, filed on Aug. 6, 2020, the disclosure of which is hereby incorporated by reference in its entirety.

TECHNICAL FIELD

The present disclosure relates to the field of communication technologies, and in particular, to a communication method, an apparatus, and a system.

BACKGROUND

In a conventional mobile network, signaling communication and data communication paths between terminal devices need to pass through a network-side device (for example, a base station/serving gateway (SGW)/packet data gateway (PGW)). Different terminal devices cannot directly communicate with each other. Even if two terminal devices close to each other, for example, a terminal device 1 and a terminal device 2, transmit data, the terminal device 1 needs to first send the data to a connected base station 1, and then the data is transmitted by a network side and arrives at a base station 2 connected to the terminal device 2 (in this case, the base station 1 and the base station 2 may be a same base station, or may be different base stations), and finally the base station 2 sends the data to the terminal device 2. This imposes a large requirement for network transmission bandwidth and has low transmission efficiency.

Device-to-device (D2D) communication requires short-distance direct communication. Therefore, a proximity-based services (ProSe) subject is proposed. ProSe requires that data exchange is directly performed between terminal devices, or data exchange is performed with involvement of a base station but without a core network device (for example, an SGW/a PGW). Therefore, this improves communication efficiency between terminal devices close to each other.

With development of a ProSe technology and introduction of a PC5 interface based on short-distance direct communication between terminal devices to the ProSe subject, data and signaling may be transmitted between terminal devices without being forwarded by a base station. Because terminal devices directly communicate with each other through the PC5 interface, which is similar to Uu interface-based Uu communication between a terminal device and a base station, direct communication between terminal devices through the PC5 interface may also be referred to as PC5 unicast communication.

Currently, before unicast data exchange between terminal devices is established using the ProSe technology, a ProSe discovery procedure and a PC5 unicast establishment procedure need to be performed in sequence. The ProSe discovery procedure implements mutual discovery between two terminal devices, and the PC5 unicast establishment procedure establishes a signaling connection and a data connection for direct communication between two terminal devices through the PC5 interface. In a 4th generation (4G) communication technology, a security negotiation procedure is not required in the PC5 unicast establishment procedure, and a matched security parameter is used between terminal devices by default to protect ProSe unicast communication. Therefore, a PC5 unicast establishment failure resulting from inconsistency between security parameters does not occur in the PC5 unicast establishment procedure. However, in a 5th generation (5G) communication technology, a short-distance direct communication service is used in vehicle-to-everything (V2X). Security negotiation is introduced to the PC5 unicast establishment procedure in a V2X scenario, and inconsistency between security parameters of terminal devices at two ends leads to a PC5 unicast establishment failure.

SUMMARY

Embodiments of the present disclosure provide a communication method, an apparatus, and a system, to resolve a PC5 unicast establishment failure due to inconsistency between security parameters of terminal devices at two ends in a V2X scenario with security negotiation introduced into a PC5 unicast establishment procedure.

To achieve the foregoing objective, the following technical solutions are used in embodiments of the present disclosure.

According to a first aspect, a communication method is provided. The method includes: A first direct communication discovery name management function network element obtains a security parameter of a first terminal device. A security parameter is required for establishing a PC5 connection between the first terminal device and a second terminal device. The first direct communication discovery name management function network element receives a security parameter of the second terminal device from a second direct communication discovery name management function network element. The first direct communication discovery name management function network element determines, based on whether the security parameter of the first terminal device matches the security parameter of the second terminal device, whether the first terminal device and the second terminal device support mutual communication. Security negotiation is introduced to a PC5 unicast establishment procedure in an existing V2X scenario, and inconsistency between security parameters of terminal devices at two ends leads to a PC5 unicast establishment failure. In this case, because a ProSe discovery procedure is completed, and some steps of the PC5 unicast establishment procedure are also performed, excessive signaling is wasted. In this embodiment, matching may be performed between the security parameter of the first terminal device and the security parameter of the second terminal device in the ProSe discovery procedure, and whether the first terminal device and the second terminal device support mutual communication is determined based on whether the security parameter of the first terminal device matches the security parameter of the second terminal device. Further, if the first terminal device and the second terminal device do not support mutual communication, the current ProSe discovery procedure may be terminated in time. Therefore, this can avoid a waste of signaling resulting from a PC5 unicast establishment failure due to inconsistency between security parameters of terminal devices at two ends in the PC5 unicast establishment procedure after the ProSe discovery procedure in the conventional technology.

In a possible implementation, that the first direct communication discovery name management function network element determines, based on whether the security parameter of the first terminal device matches the security parameter of the second terminal device, whether the first terminal device and the second terminal device support mutual communication includes: When the security parameter of the first terminal device does not match the security parameter of the second terminal device, the first direct communication discovery name management function network element determines that the first terminal device and the second terminal device do not support mutual communication.

In a possible implementation, the communication method provided in this embodiment further includes: The first direct communication discovery name management function network element sends first indication information indicating that the first terminal device and the second terminal device do not support mutual communication. In this way, the first terminal device may determine that the first terminal device does not support mutual communication with the second terminal device, or the second terminal device may determine that the second terminal device does not support mutual communication with the first terminal device, so that the current ProSe discovery procedure may be terminated in time. This avoids a waste of signaling resulting from a PC5 unicast establishment failure due to inconsistency between security parameters of terminal devices at two ends in the PC5 unicast establishment procedure after the ProSe discovery procedure in the conventional technology.

In a possible implementation, that the first direct communication discovery name management function network element determines, based on whether the security parameter of the first terminal device matches the security parameter of the second terminal device, whether the first terminal device and the second terminal device support mutual communication includes: When the security parameter of the first terminal device matches the security parameter of the second terminal device, the first direct communication discovery name management function network element determines that the first terminal device and the second terminal device support mutual communication.

In a possible implementation, the communication method provided in this embodiment further includes: The first direct communication discovery name management function network element sends second indication information indicating that the first terminal device and the second terminal device support mutual communication. In this way, the first terminal device may determine that the first terminal device supports mutual communication with the second terminal device, or the second terminal device may determine that the second terminal device supports mutual communication with the first terminal device, so that the current ProSe discovery procedure may be continued. This avoids a waste of signaling resulting from a PC5 unicast establishment failure due to inconsistency between security parameters of terminal devices at two ends in the PC5 unicast establishment procedure after the ProSe discovery procedure in the conventional technology.

In a possible implementation, the communication method provided in this embodiment further includes: The first direct communication discovery name management function network element sends a discovery response to the first terminal device. The discovery response includes a discovery parameter for service discovery. Based on this solution, after receiving the discovery response, the first terminal device may determine that the first terminal device supports mutual communication with the second terminal device. In other words, the first terminal device may consider that the security parameter of the first terminal device matches the security parameter of the second terminal device, so that a subsequent ProSe discovery procedure may be continued. This avoids a waste of signaling resulting from a PC5 unicast establishment failure due to inconsistency between security parameters of terminal devices at two ends in the PC5 unicast establishment procedure after the ProSe discovery procedure in the conventional technology.

In a possible implementation, the communication method provided in this embodiment further includes: The first direct communication discovery name management function network element sends the security parameter of the first terminal device to the first terminal device. Based on this solution, the first terminal device may obtain the security parameter of the first terminal device.

In a possible implementation, the security parameter in this embodiment includes a security policy and/or a security capability.

In a possible implementation, the security parameter in this embodiment includes the security capability. That a first direct communication discovery name management function network element obtains a security parameter of a first terminal device includes: The first direct communication discovery name management function network element receives the security capability of the first terminal device from a corresponding mobility management network element; or the first direct communication discovery name management function network element receives the security capability of the first terminal device from the first terminal device. In other words, in this embodiment, the first direct communication discovery name management function network element may obtain both the security capability of the first terminal device from the first terminal device and the security capability of the first terminal device from a network side.

In a possible implementation, the security parameter in this embodiment includes the security policy. That a first direct communication discovery name management function network element obtains a security parameter of a first terminal device includes: The first direct communication discovery name management function network element receives the security policy of the first terminal device from the first terminal device; the first direct communication discovery name management function network element obtains the security policy of the first terminal device from a corresponding policy control network element; or the first direct communication discovery name management function network element obtains the security policy of the first terminal device from a corresponding unified data management network element. In other words, in this embodiment, the first direct communication discovery name management function network element may obtain both the security policy of the first terminal device from the first terminal device and the security policy of the first terminal device from a network side.

In a possible implementation, the security policy in this embodiment includes a user plane confidentiality protection policy and an integrity protection policy in the PC5 connection. Based on the security policy, user plane security protection in the PC5 connection can be implemented.

In a possible implementation, the security capability in this embodiment includes one or more confidentiality protection algorithms and one or more integrity protection algorithms supported in the PC5 connection. Based on the security policy, control plane and/or user plane security protection in the PC5 connection can be implemented.

According to a second aspect, a communication apparatus is provided, to implement the foregoing method. The communication apparatus may be the first direct communication discovery name management function network element in the first aspect, or an apparatus including the first direct communication discovery name management function network element. The communication apparatus includes a corresponding module, unit, or means for implementing the foregoing method. The module, unit, or means may be implemented by hardware or software, or implemented by hardware executing corresponding software. The hardware or the software includes one or more modules or units corresponding to the foregoing functions.

According to a third aspect, a communication apparatus is provided. The communication apparatus includes a processor and a memory. The memory is configured to store computer instructions. When the processor executes the instructions, the communication apparatus is enabled to perform the method in the first aspect. The communication apparatus may be the first direct communication discovery name management function network element in the first aspect, or an apparatus including the first direct communication discovery name management function network element.

According to a fourth aspect, a communication apparatus is provided. The communication apparatus includes a processor. The processor is configured to perform the method in the first aspect based on instructions after the processor is coupled to a memory and reads the instructions in the memory. The communication apparatus may be the first direct communication discovery name management function network element in the first aspect, or an apparatus including the first direct communication discovery name management function network element.

According to a fifth aspect, a communication apparatus is provided. The communication apparatus includes a processor and an interface circuit. The interface circuit is configured to receive a computer program or instructions and transmit the computer program or the instructions to the processor. The processor is configured to execute the computer program or the instructions, to enable the communication apparatus to perform the method in the first aspect.

According to a sixth aspect, a computer-readable storage medium is provided. The computer-readable storage medium stores instructions. When the instructions are run on a computer, the computer is enabled to perform the method in the first aspect.

According to a seventh aspect, a computer program product including instructions is provided. When the computer program product runs on a computer, the computer is enabled to perform the method in the first aspect.

According to an eighth aspect, a communication apparatus (for example, the communication apparatus may be a chip or a chip system) is provided. The communication apparatus includes a processor, configured to implement a function in the first aspect. In a possible implementation, the communication apparatus further includes a memory. The memory is configured to store program instructions and data that are necessary. When the communication apparatus is a chip system, the communication apparatus may include a chip, or may include a chip and another discrete component.

For technical effects brought by any one of the possible implementations of the second aspect to the eighth aspect, refer to the technical effects brought by the different designs of the first aspect.

According to a ninth aspect, a communication system is provided. The communication system includes a first direct communication discovery name management function network element and a second direct communication discovery name management function network element. The first direct communication discovery name management function network element is configured to obtain a security parameter of a first terminal device. A security parameter is required for establishing a PC5 connection between the first terminal device and a second terminal device. The second direct communication discovery name management function network element is configured to obtain a security parameter of the second terminal device, and send the security parameter of the second terminal device to the first direct communication discovery name management function network element. The first direct communication discovery name management function network element is further configured to: receive the security parameter of the second terminal device from the second direct communication discovery name management function network element, and determine, based on whether the security parameter of the first terminal device matches the security parameter of the second terminal device, whether the first terminal device and the second terminal device support mutual communication. For technical effects of the eighth aspect, refer to the first aspect.

BRIEF DESCRIPTION OF DRAWINGS

FIG. 7 is a schematic flowchart of a communication method according to an embodiment of the present disclosure; and FIG. 8 is a schematic diagram of a structure of a communication apparatus according to an embodiment of the present disclosure.

DESCRIPTION OF EMBODIMENTS

Figure 1:
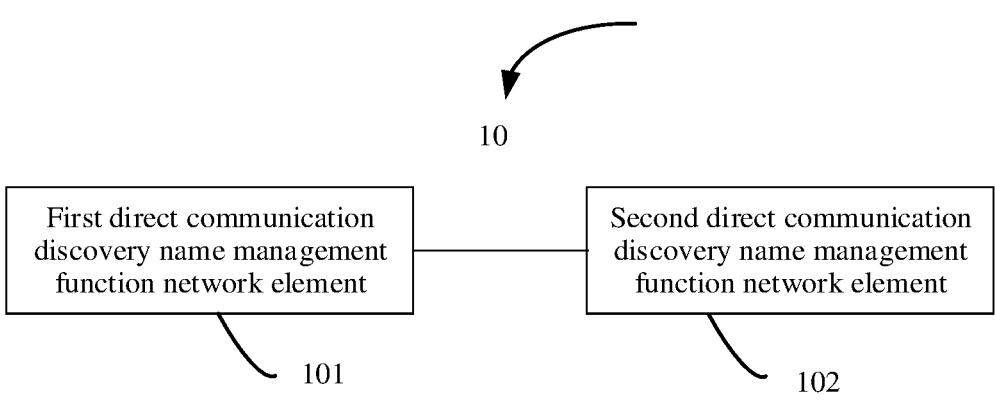
FIG. 1 is a schematic diagram of a structure of a communication system according to an embodiment of the present disclosure.

For ease of understanding of the technical solutions in embodiments of the present disclosure, the technologies related to the present disclosure are first briefly described as follows.

1. Discovery Type

In this embodiment, the discovery type includes open discovery and restricted discovery. For related descriptions of the open discovery and the restricted discovery, refer to the existing 3rd generation partnership project (3GPP) technical standard (TS) 23.303, v15.1.0. Details are not described herein. For example, if a terminal device plays a game by itself and has no specific game partner, the terminal device may initiate open discovery to "randomly" find a game partner. However, if the terminal device has a specific partner for playing a game, the terminal device may "specify" a partner through the restricted discovery. Only the partner specified by the terminal device can access the game. Therefore, the open discovery is like a Shake application, through which another user who enables a Shake application can be found. The restricted discovery is like face-to-face group creation. Only a user who knows a group number can join a group.

2. Discovery Mode

In an existing 4G ProSe standard (3GPP TS 23.303, v15.1.0), Model A and Model B are defined. A difference between Model A and Model B lies in a discovery initiation mode. Model A involves one UE announcing "I am here". In a discovery procedure of Model A, terminal devices at two ends are classified into announcing user equipment (UE) (announcing UE) and monitoring UE. The announcing UE broadcasts "I am here". After receiving the message broadcast by the announcing UE, the monitoring UE determines, based on whether a service requirement of the monitoring UE is met, whether to establish a proximity-based services connection with the announcing UE. Model B involves one UE asking "Who is there/Are you there". In a discovery procedure of Model B, terminal devices at two ends are classified into discoveree UE and discoverer UE. The discoverer UE initiates a specific service request including specific information, that is, "Who is there/Are you there". After receiving the service request initiated by the discoverer UE, the discoveree UE determines, based on whether the discoveree UE can provide a service, whether to reply to the request message. If the discoveree UE replies a response message, it indicates that "I am here". In embodiments of the present disclosure, an example in which the open discovery scenario is applicable to the discovery mode of Model A, and the restricted discovery scenario is applicable to the discovery modes of Model A and Model B is used for description.

3. Discovery Command

In embodiments of the present disclosure, the discovery command is for notifying a network side whether two terminal devices communicating with each other are announcing UE or monitoring UE, and whether the two terminal devices are a response terminal device or a query terminal device (query UE). The announcing UE and the monitoring UE are the terminal devices at two ends in the foregoing discovery procedure of Model A. The response UE and the query UE respectively correspond to the discoveree UE and the discoverer UE in the foregoing discovery procedure of Model B.

4. User Identity for a ProSe Service

In embodiments of the present disclosure, the user identity for the ProSe service may be a proximity-based services application identifier (ProSe application ID), a restricted proximity-based services application user identifier (restricted ProSe application user ID, RPAUID), a proximity-based services discovery UE identifier (ProSe discovery UE ID, PDUID), or the like. In embodiments of the present disclosure, an example in which the ProSe application ID is used for the open discovery scenario, and the PDUID or the RPAUID is used for the restricted discovery scenario is used for description.

5. Security Policy and Security Policy Match.

The security policy is a policy for describing whether to enable security protection, and is used to determine a security protection method. In embodiments of the present disclosure, security policies in different scenarios include at least one of the following:

a control plane confidentiality protection policy in a PC5 connection;

a control plane integrity protection policy in a PC5 connection;

a user plane confidentiality protection policy in a PC5 connection; or a user plane integrity protection policy in a PC5 connection.

Control plane confidentiality protection is to protect confidentiality of signaling in a transmission process. Control plane integrity protection is to protect integrity of signaling in a transmission process. User plane confidentiality protection is to protect confidentiality of user plane data in a transmission process. User plane integrity protection is to protect integrity of user plane data in a transmission process. In embodiments of the present disclosure, integrity means that obtained signaling or data is consistent with original signaling or data and is not modified. Therefore, integrity protection is to prevent attackers "from attacking". Confidentiality means that real content cannot be directly seen. Therefore, confidentiality protection is to prevent attackers "from understanding". In addition, the confidentiality protection in embodiments of the present disclosure may also be referred to as encryption protection.

In embodiments of the present disclosure, the control plane confidentiality protection policy in the PC5 connection and the control plane integrity protection policy in the PC5 connection belong to control plane security policies in the PC5 connection. The user plane confidentiality protection policy in the PC5 connection and the user plane integrity protection policy in the PC5 connection belong to user plane security policies in the PC5 connection.

In embodiments of the present disclosure, there are three types of protection policies in total: REQUIRED, NOT NEEDED, and PREFERRED. REQUIRED indicates that security needs to be enabled. NOT NEEDED indicates that security does not need to be enabled. PREFERRED indicates that security is preferred to be enabled, meaning that security may be enabled and may not be enabled.

For example, the control plane confidentiality protection policy in the PC5 connection is used as an example. The control plane confidentiality protection policy in the PC5 connection includes: control plane confidentiality protection REQUIRED in the PC5 connection, control plane confidentiality protection NOT NEEDED in the PC5 connection, or control plane confidentiality protection PREFERRED in the PC5 connection. For an example of the control plane integrity protection policy in the PC5 connection, the user plane confidentiality protection policy in the PC5 connection, or the user plane integrity protection policy in the PC5 connection, refer to the example of the control plane confidentiality protection policy in the PC5 connection.

It should be noted that, in embodiments of the present disclosure, when a security policy is sent, only one of three types (REQUIRED, NOT NEEDED, and PREFERRED) is generally selected for sending. In some special scenarios, at least two types may be selected for sending, and one of the at least two types is PREFERRED. For example, when NOT NEEDED and PREFERRED are sent, it indicates that security protection is not preferred to be enabled. When REQUIRED and PREFERRED are sent, it indicates that security protection is preferred to be enabled.

In embodiments of the present disclosure, for a specific protection policy in the security policy, it is assumed that a protection policy of a terminal device is REQUIRED and a protection policy of another terminal device is NOT NEEDED, it may be considered that the protection policies of the two terminal devices do not match. Otherwise, it may be considered that the protection policies of the two terminal devices match.

For example, the user plane confidentiality protection in the PC5 connection is used as an example. It is assumed that a user plane confidentiality protection policy of a first terminal device in the PC5 connection is NOT NEEDED, and a user plane confidentiality protection policy of a second terminal device in the PC5 connection is REQUIRED. Alternatively, it is assumed that the user plane confidentiality protection policy of the first terminal device in the PC5 connection is REQUIRED, and the user plane confidentiality protection policy of the second terminal device in the PC5 connection is NOT NEEDED. It may be determined that the user plane confidentiality protection policies of the first terminal device and the second terminal device in the PC5 connection do not match. In another case, it may be considered that the user plane confidentiality protection policies of the first terminal device and the second terminal device in the PC5 connection match.

In a possible implementation, in embodiments of the present disclosure, when the security policy includes one protection policy, that security policies match means that the protection policies match. For example, it is assumed that the security policy includes only the user plane confidentiality protection policy in the PC5 connection, it may be considered that security policies match provided that the user plane confidentiality protection policies in the PC5 connection match.

In another possible implementation, in embodiments of the present disclosure, when the security policy includes a plurality of protection policies, that security policies match means that each of the plurality of protection policies matches with each other. For example, it is assumed that the security policy includes the user plane confidentiality protection policy and the integrity protection policy in the PC5 connection. When the user plane confidentiality protection policies in the PC5 connection match and the user plane integrity protection policies in the PC5 connection match, it may be considered that the security policies match. Otherwise, it is considered that the security policy does not match.

It should be noted that, in embodiments of the present disclosure, a plurality of protection policies in the control plane confidentiality protection policy in the PC5 connection, the control plane integrity protection policy in the PC5 connection, the user plane confidentiality protection policy in the PC5 connection, or the user plane integrity protection policy in the PC5 connection may be the same. This is not specifically limited in embodiments of the present disclosure.

6. Security Capability and Security Capability Match.

The security capability in embodiments of the present disclosure includes at least one of the following:

one or more control plane confidentiality protection algorithms supported in a PC5 connection;

one or more control plane integrity protection algorithms supported in the PC5 connection;

one or more user plane confidentiality protection algorithms supported in the PC5 connection; or one or more user plane integrity protection algorithms supported in the PC5 connection.

The one or more control plane confidentiality protection algorithms supported in the PC5 connection and the one or more control plane integrity protection algorithms supported in the PC5 connection belong to control plane security capabilities in the PC5 connection. The one or more user plane confidentiality protection algorithms supported in the PC5 connection and the one or more user plane integrity protection algorithms supported in the PC5 connection belong to user plane security capabilities in the PC5 connection.

In embodiments of the present disclosure, for a specific protection algorithm in the security capability, it is assumed that there is a common algorithm between one or more protection algorithms supported by a terminal device in the PC5 connection and one or more protection algorithms supported by another terminal device in the PC5 connection, it may be considered that the protection algorithms of the two terminal devices match. Otherwise, it may be considered that the protection algorithms of the two terminal devices do not match.

For example, the user plane confidentiality protection in the PC5 connection is used as an example. It is assumed that user plane confidentiality protection algorithms of the first terminal device in the PC5 connection are NEA0, NEA1, and NEA2, and user plane confidentiality protection algorithms of the second terminal device in the PC5 connection are NEA1 and NEA2. In this case, there are common algorithms among the user plane confidentiality protection algorithms of the two terminal devices in the PC5 connection: NEA1 and NEA2. It may be further determined that the user plane confidentiality protection algorithms of the first terminal device and the second terminal device in the PC5 connection match. Otherwise, it is determined that the user plane confidentiality protection algorithms of the first terminal device and the second terminal device in the PC5 connection do not match.

In a possible implementation, in embodiments of the present disclosure, when the security capability includes one protection algorithm, that security capabilities match means that the protection algorithms match. For example, it is assumed that the security capability includes only the user plane confidentiality protection algorithm in the PC5 connection, it may be considered that the security capabilities match provided that the user plane confidentiality protection algorithms in the PC5 connection match.

In another possible implementation, in embodiments of the present disclosure, when the security capability includes a plurality of protection algorithms, that security capabilities match means that each of the plurality of protection algorithms matches with each other. For example, it is assumed that the security capability includes the user plane confidentiality protection algorithm and the integrity protection algorithm in the PC5 connection. When the user plane confidentiality protection algorithms in the PC5 connection match and the user plane integrity protection algorithms in the PC5 connection match, it may be considered that the security capabilities match. Otherwise, it is considered that the security capabilities do not match.

It should be noted that, in embodiments of the present disclosure, there may be a common algorithm among a plurality of protection algorithms in the one or more control plane confidentiality protection algorithms supported in the PC5 connection, the one or more control plane integrity protection algorithms supported in the PC5 connection, the one or more user plane confidentiality protection algorithms supported in the PC5 connection, or the one or more user plane integrity protection algorithms supported in the PC5 connection; or the plurality of protection algorithms may be the same. This is not specifically limited in embodiments of the present disclosure.

7. Security Protection Method

There are three types of security protection methods in embodiments of the present disclosure.

(1) A security protection method used for the $1^{st}$ PC5 announcing message in the ProSe discovery procedure, to protect the $1^{st}$ PC5 announcing message in the ProSe discovery procedure;

(2) A security protection method used for a control plane in the PC5 connection, to protect control plane signaling in the PC5 connection; and (3) A security protection method used for a user plane in the PC5 connection, to protect user plane data in the PC5 connection.

In embodiments of the present disclosure, the security protection method includes whether confidentiality protection and/or integrity protection are/is enabled.

For example, the security protection method used for the $1^{st}$ PC5 announcing message may include, for example, whether confidentiality protection and/or integrity protection are/is enabled for the $1^{st}$ PC5 announcing message; the security protection method used for the control plane in the PC5 connection may include, for example, whether confidentiality protection and/or integrity protection are/is enabled for the control plane in the PC5 connection; or the security protection method used for the user plane in the PC5 connection may include, for example, whether confidentiality protection and/or integrity protection are/is enabled for the user plane in the PC5 connection.

It should be noted that, in embodiments of the present disclosure, the security protection method used for the control plane in the PC5 connection and the security protection method used for the user plane in the PC5 connection are the security protection method for the PC5 connection.

The following describes the technical solutions in embodiments of the present disclosure with reference to the accompanying drawings in embodiments of the present disclosure. In the descriptions of the present disclosure, unless otherwise specified, "/" indicates an "or" relationship between associated objects. For example, A/B may indicate A or B. In the present disclosure, "and/or" describes only an association relationship between associated objects and indicates that any one of three relationships may exist. For example, A and/or B may indicate any one of the following three cases: Only A exists, both A and B exist, and only B exists, where A and B may be singular or plural. In addition, in the descriptions of the present disclosure, "a plurality of" means two or more than two unless otherwise specified. "At least one item (piece) of the following" or a similar expression thereof indicates any combination of the items, including any combination of singular items (pieces) or plural items (pieces). For example, at least one item (piece) of a, b, or c may indicate: a, b, c, a and b, a and c, b and c, or a, b, and c, where a, b, and c may be singular or plural. In addition, to clearly describe technical solutions in embodiments of the present disclosure, terms such as "first" and "second" are used in embodiments of the present disclosure to distinguish between same items or similar items that provide basically same functions or purposes. A person skilled in the art may understand that the terms such as "first" and "second" do not limit a quantity or an execution sequence, and the terms such as "first" and "second" do not indicate a definite difference. In addition, in embodiments of the present disclosure, terms such as "example" and "for example" are used to represent giving an example, an illustration, or a description. Any embodiment or design scheme described as an "example" or "for example" in embodiments of the present disclosure should not be explained as being more preferred or having more advantages than another embodiment or design scheme. Exactly, use of the terms such as "example" or "for example" is intended to present a related concept in a specific manner for ease of understanding.

In addition, the network architecture and the service scenario described in embodiments of the present disclosure are intended to describe the technical solutions in embodiments of the present disclosure more clearly, and do not constitute a limitation on the technical solutions provided in embodiments of the present disclosure. A person of ordinary skill in the art may know that: With the evolution of the network architecture and the emergence of new service scenarios, the technical solutions provided in embodiments of the present disclosure are also applicable to similar technical problems.

FIG. 1 shows a communication system 10 according to embodiments of the present disclosure. The communication system 10 includes a first direct communication discovery name management function network element 101 and a second direct communication discovery name management function network element 102. The first direct communication discovery name management function network element 101 and the second direct communication discovery name management function network element 102 may directly communicate with each other, or may communicate with each other through forwarding by another device. This is not specifically limited in embodiments of the present disclosure.

The first direct communication discovery name management function network element 101 is configured to obtain a security parameter of a first terminal device. A security parameter is required for establishing a PC5 connection between the first terminal device and a second terminal device;

The second direct communication discovery name management function network element 102 is configured to: obtain a security parameter of the second terminal device, and send the security parameter of the second terminal device to the first direct communication discovery name management function network element 101.

The first direct communication discovery name management function network element 101 is further configured to: receive the security parameter of the second terminal device from the second direct communication discovery name management function network element 102, and determine, based on whether the security parameter of the first terminal device matches the security parameter of the second terminal device, whether the first terminal device and the second terminal device support mutual communication. The specific implementation of this solution is to be described in detail in subsequent method embodiments.

Security negotiation is introduced to a PC5 unicast establishment procedure in an existing V2X scenario, and inconsistency between security parameters of terminal devices at two ends leads to a PC5 unicast establishment failure. In this case, because a ProSe discovery procedure is completed, and some steps of the PC5 unicast establishment procedure are also performed, excessive signaling is wasted. In embodiments of the present disclosure, matching may be performed between the security parameter of the first terminal device and the security parameter of the second terminal device in the ProSe discovery procedure, and whether the first terminal device and the second terminal device support mutual communication is determined based on whether the security parameter of the first terminal device matches the security parameter of the second terminal device. Further, if the first terminal device and the second terminal device do not support mutual communication, the current ProSe discovery procedure may be terminated in time. Therefore, this can avoid a waste of signaling resulting from a PC5 unicast establishment failure due to inconsistency between security parameters of terminal devices at two ends in the PC5 unicast establishment procedure after the ProSe discovery procedure in the conventional technology. The security parameter in embodiments of the present disclosure includes a security policy and/or a security capability. This is uniformly described herein.

Optionally, the communication system 10 shown in FIG. 1 is applicable to a currently discussed 5G network, or is applicable to another future network, or the like. This is not specifically limited in embodiments of the present disclosure.

For example, the communication system 10 shown in FIG. 1 is applicable to the currently discussed 5G network. A network element or an entity corresponding to a direct communication discovery name management function network element (including the first direct communication discovery name management function network element 101 and the second direct communication discovery name management function network element 102) in embodiments of the present disclosure may be a direct communication discovery name management function (direct discovery name management function, DDNMF) network element in the 5G network.

Figure 2:
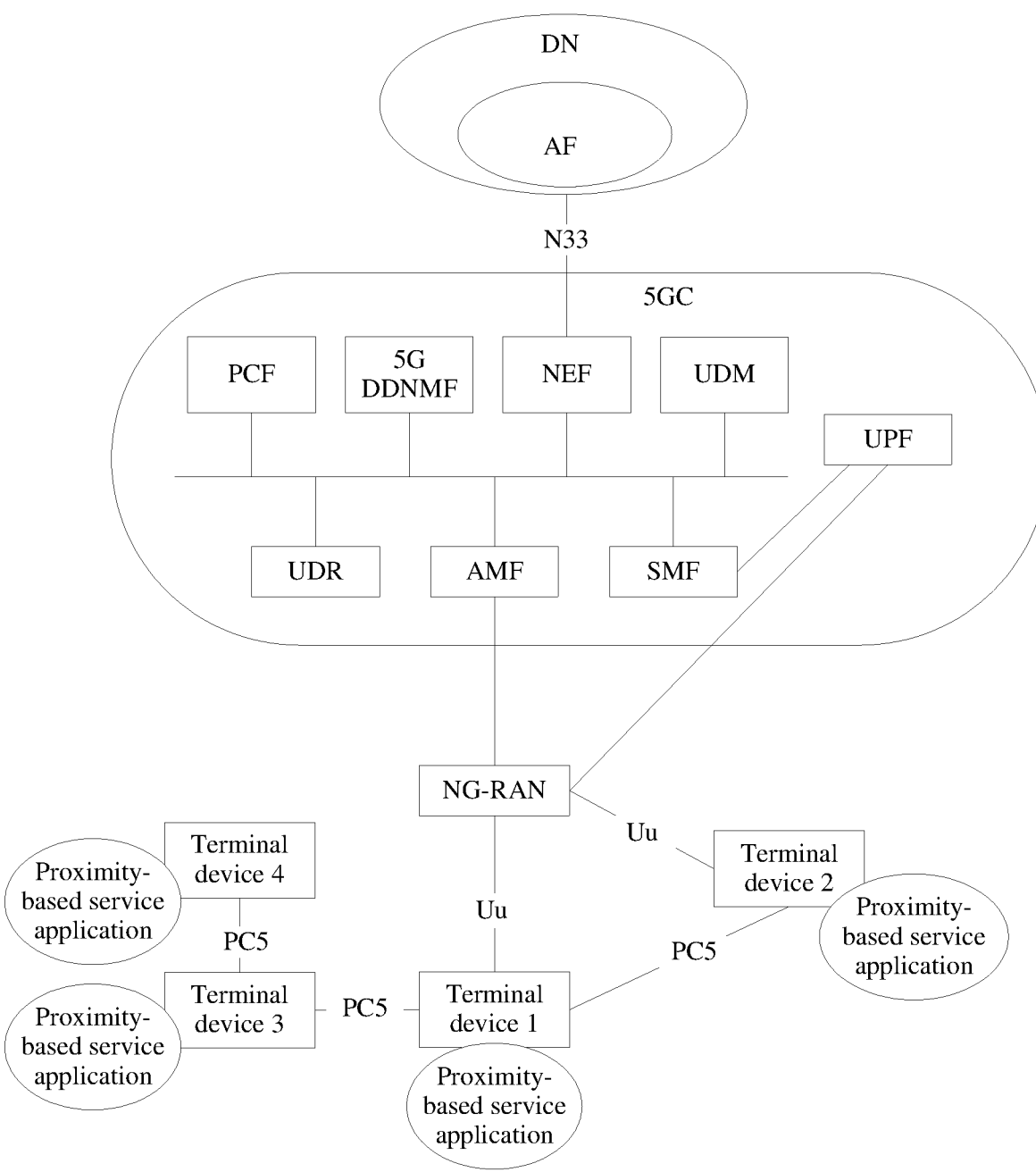
FIG. 2 is a schematic diagram of an architecture of a ProSe control plane in a 5G network according to an embodiment of the present disclosure.

FIG. 2 is a schematic diagram of an architecture of a ProSe control plane in a 5G network according to embodiments of the present disclosure. The architecture includes one or more terminal devices (FIG. 2 schematically shows a terminal device 1, a terminal device 2, a terminal device 3, and a terminal device 4), a next generation radio access network (NG-RAN) device, a unified data repository (UDR) network element, a unified data management (UDM) network element, a session management function (SMF) network element, an access and mobility management function (AMF) network element, a network exposure function (NEF) network element, a policy control function (PCF) network element, a user plane function (UPF) network element, a 5G DDNMF network element, and a data network (DN).

Compared with a terminal device in conventional cellular network communication, a terminal device for ProSe communication needs to have a proximity-based services application (ProSe application) function, and terminal devices having the ProSe application function communicate with each other through a PC5 interface. The ProSe application corresponds to a ProSe application server. The ProSe application server may be an application function (AF) network element in the DN. The AF having a ProSe application server function has all functions of an AF defined in the 3GPP 23.501 R15 and related functions for a ProSe service. To be specific, in the architecture of the ProSe control plane in the 5G network, the ProSe application server and the terminal device perform user plane communication through the following path: terminal device—NG-RAN device— UPF network element-AF network element. In addition, the ProSe application server may further communicate with another network function (NF) in a 5G core network (5GC) via the NEF, for example, communicate with a PCF network element via the NEF network element.

In embodiments of the present disclosure, the DDNMF network element has a function of allocating and processing, for open proximity-based services direct discovery (open ProSe direct discovery), a mapping relationship between a proximity-based services application identifier (ProSe application ID) and a code used for ProSe discovery. In restricted proximity-based services direct discovery (restricted ProSe direct discovery), the DDNMF network element communicates with the ProSe application server through a PC2 interface, to handle authorization for a discovery request.

In addition, for related descriptions of the AMF network element, the UDR network element, the SMF network element, the UPF network element, the UDM network element, the NEF network element, or the PCF network element, refer to the existing 3GPP 5G standard.

Optionally, the terminal device in embodiments of the present disclosure may be a device configured to implement a wireless communication function, for example, a terminal or a chip that can be used in the terminal. The terminal device may be deployed on land, where the deployment includes indoor or outdoor, or handheld or vehicle-mounted deployment, may be deployed on water (for example, on a ship), or may be deployed in air (for example, on an airplane, a balloon, and a satellite). The terminal may be UE, an access terminal, a terminal unit, a terminal station, a mobile station, a remote station, a remote terminal, a mobile device, a wireless communication device, a terminal agent, a terminal apparatus, or the like in the 5G network or a future evolved public land mobile network (PLMN). The access terminal may be a cellular phone, a cordless phone, a session initiation protocol (SIP) phone, a wireless local loop (WLL) station, a personal digital assistant (PDA), a handheld device having a wireless communication function, a computing device or another processing device connected to a wireless modem, a vehicle-mounted device or a wearable device, an unmanned aerial vehicle (UAV) or a unmanned aerial vehicle controller (UAVC), a virtual reality (VR) terminal device, an augmented reality (AR) terminal device, a wireless terminal in industrial control, a wireless terminal in self driving, a wireless terminal in remote medical, a wireless terminal in a smart grid, a wireless terminal in transportation safety, a wireless terminal in a smart city, a wireless terminal in a smart home, or the like. The terminal may be mobile or at a fixed location.

Optionally, a RAN device in embodiments of the present disclosure is a device that provides a wireless communication function for the terminal device. For example, an access network device includes but is not limited to a next-generation base station (gNodeB, gNB) in 5G, an evolved NodeB (eNB), a radio network controller (RNC), a NodeB (NB), a base station controller (BSC), a base transceiver station (BTS), a home base station (for example, home evolved NodeB, or home NodeB, HNB), a baseband unit (BBU), a transmission reception point (TRP), a transmission point (TP), a mobile switching center, and the like.

Optionally, in embodiments of the present disclosure, a first direct communication discovery name management function network element and a second direct communication discovery name management function network element may also be referred to as a communication apparatus, and may be a general-purpose device or a dedicated device. This is not specifically limited in embodiments of the present disclosure.

Optionally, in embodiments of the present disclosure, related functions of the first direct communication discovery name management function network element and the second direct communication discovery name management function network element may be implemented by one device, may be jointly implemented by a plurality of devices, or may be implemented by one or more functional modules in one device. This is not specifically limited in embodiments of the present disclosure. It may be understood that the foregoing function may be a network element in a hardware device, may be a software function running on dedicated hardware, a combination of hardware and software, or a virtualization function instantiated on a platform (for example, a cloud platform).

Figure 3:
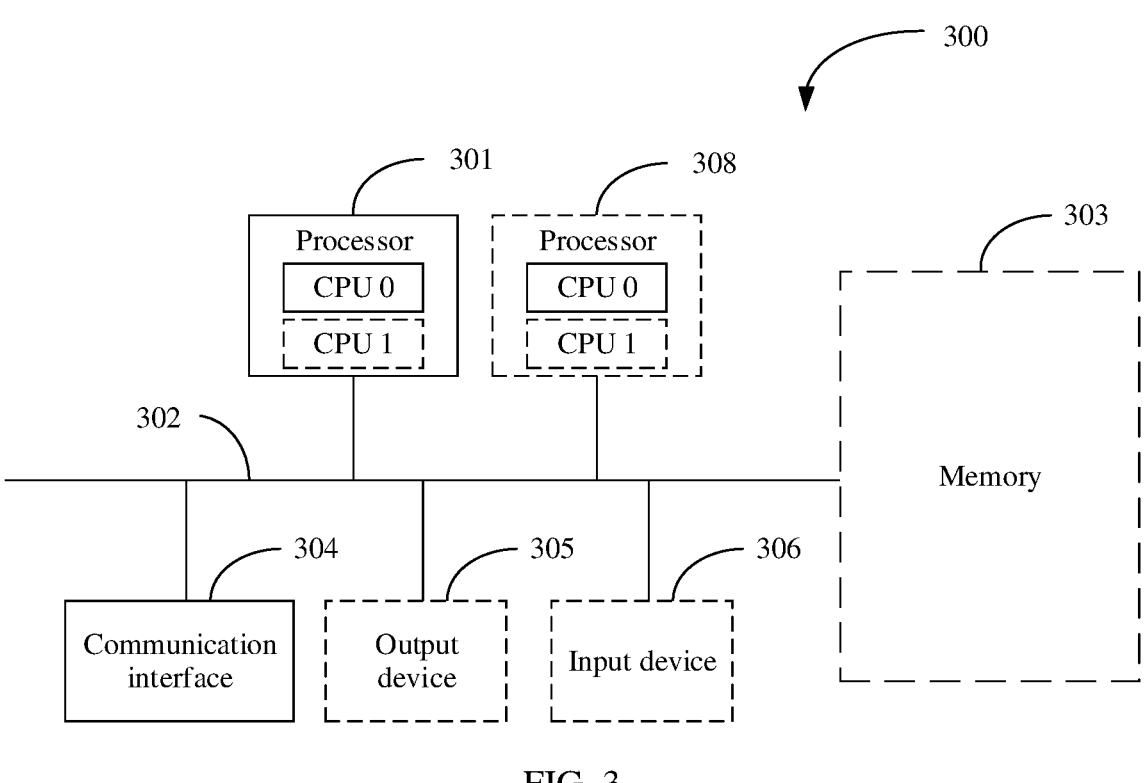
FIG. 3 is a schematic diagram of a structure of a communication device according to an embodiment of the present disclosure.

For example, in embodiments of the present disclosure, related functions of the first direct communication discovery name management function network element and the second direct communication discovery name management function network element may be implemented by a communication device 300 in FIG. 3. FIG. 3 is a schematic diagram of a structure of a communication device 300 according to embodiments of the present disclosure. The communication device 300 includes one or more processors 301, a communication line 302, and at least one communication interface (in FIG. 3, only an example in which a communication interface 304 and one processor 301 are included is used for description). Optionally, the communication device 300 may further include a memory 303.

The processor 301 may be a general-purpose central processing unit (CPU), a microprocessor, an application-specific integrated circuit (ASIC), or one or more integrated circuits configured to control program execution of the solutions of the present disclosure.

The communication line 302 may include a path used to connect different components.

The communication interface 304 may be a transceiver module configured to communicate with another device or a communication network, for example, the Ethernet, a RAN, or a wireless local area network (WLAN). For example, the transceiver module may be an apparatus such as a transceiver. Optionally, the communication interface 304 may alternatively be a transceiver circuit located inside the processor 301, and is configured to implement signal input and signal output of the processor.

The memory 303 may be an apparatus having a storage function. For example, the memory may be a read-only memory (ROM), another type of static storage device that can store static information and instructions, a random access memory (RAM), or another type of dynamic storage device that can store information and instructions; or may be an electrically erasable programmable read-only memory ( ), a compact disc read-only memory (CD-ROM) or another optical disk storage, an optical disc storage (including a compact optical disc, a laser disc, an optical disc, a digital versatile disc, a Blu-ray optical disc, or the like), a magnetic disk storage medium or another magnetic storage device, or any other medium that can be used to carry or store expected program code in a form of an instruction structure or a data structure and that can be accessed by a computer, but is not limited thereto. The memory may exist independently, and is connected to the processor through the communication line 302. The memory may alternatively be integrated with the processor.

The memory 303 is configured to store computer-executable instructions for performing the solutions in the present disclosure, and the processor 301 controls execution. The processor 301 is configured to execute the computer-executable instructions stored in the memory 303, to implement a communication method provided in embodiments of the present disclosure.

Alternatively, optionally, in embodiments of the present disclosure, the processor 301 may perform a processing related function in a communication method provided in the following embodiments of the present disclosure, and the communication interface 304 is responsible for communication with another device or a communication network. This is not specifically limited in embodiments of the present disclosure.

Optionally, the computer-executable instructions in embodiments of the present disclosure may also be referred to as application program code. This is not specifically limited in embodiments of the present disclosure.

In specific implementation, in an embodiment, the processor 301 may include one or more CPUs, for example, a CPU 0 and a CPU 1 in FIG. 3.

In specific implementation, in an embodiment, the communication device 300 may include a plurality of processors, for example, the processor 301 and a processor 308 in FIG. 3. Each of the processors may be a single-core processor or a multi-core processor. The processor herein may include but is not limited to at least one of the following various computing devices that run software: a central processing unit (CPU), a microprocessor, a digital signal processor (DSP), a microcontroller unit (MCU), an artificial intelligence processor, or the like. Each computing device may include one or more cores configured to perform an operation or processing by executing software instructions.

In specific implementation, in an embodiment, the communication device 300 may further include an output device 305 and an input device 306. The output device 305 communicates with the processor 301, and may display information in a plurality of manners. For example, the output device 305 may be a liquid crystal display (LCD), a light emitting diode (LED) display device, a cathode ray tube (CRT) display device, a projector, or the like. The input device 306 communicates with the processor 301, and may receive an input of a user in a plurality of manners. For example, the input device 306 may be a mouse, a keyboard, a touchscreen device, or a sensing device.

The communication device 300 sometimes may also be referred to as a communication apparatus, and may be a general-purpose device or a dedicated device. For example, the communication device 300 may be a desktop computer, a portable computer, a network server, a palmtop computer (PDA), a mobile phone, a tablet computer, a wireless terminal device, an embedded device, the foregoing terminal device, the foregoing network device, or a device having a structure similar to the structure shown in FIG. 3. A type of the communication device 300 is not limited in embodiments of the present disclosure.

The following describes the communication method provided in embodiments of the present disclosure by using examples with reference to the accompanying drawings.

It should be noted that names of messages between network elements, names of parameters in the messages, or the like in the following embodiments of the present disclosure are merely examples, and there may be other names in specific implementation. This is not specifically limited in embodiments of the present disclosure.

Figure 4A:
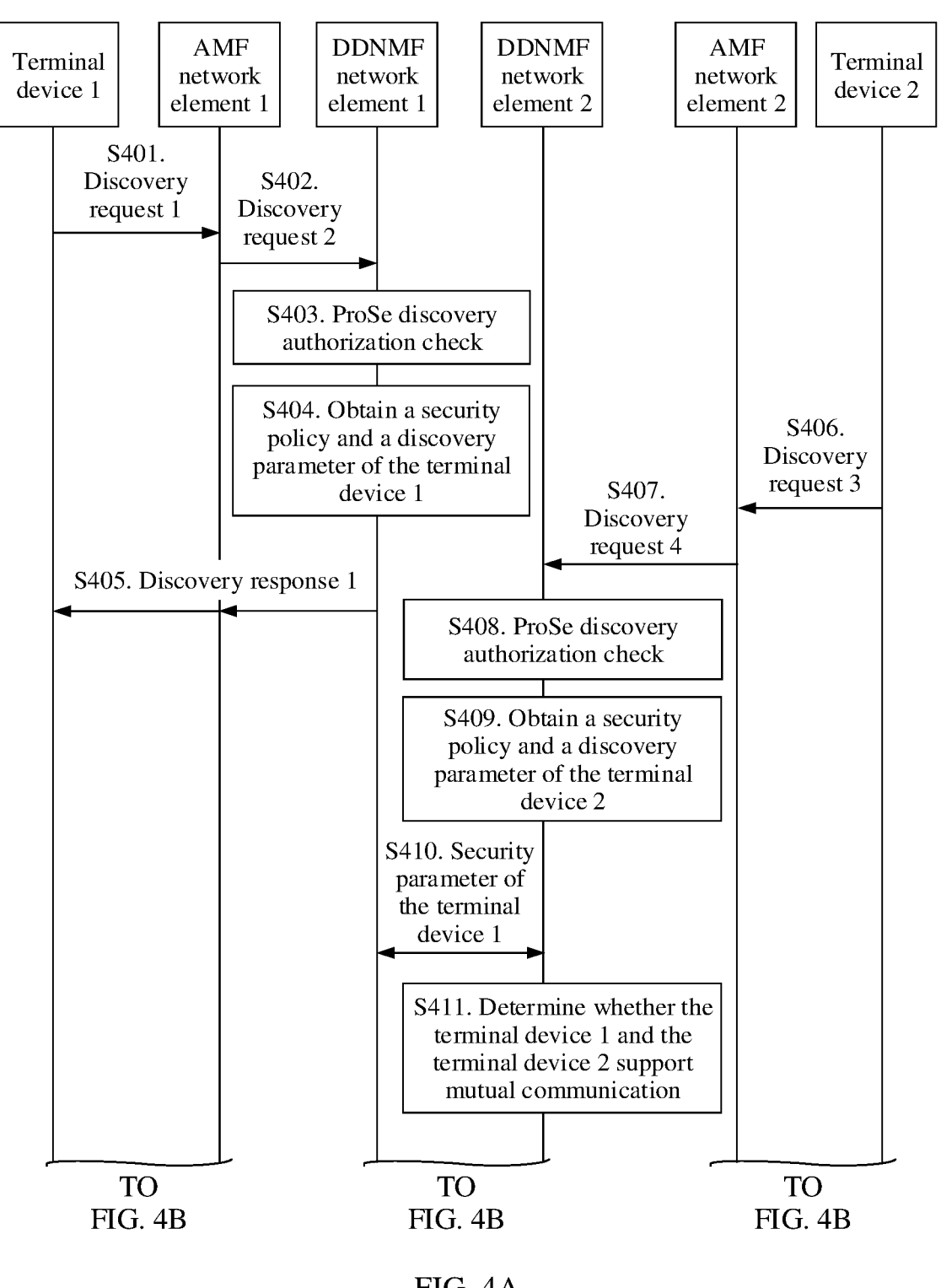
FIG. 4A and FIG. 4B are a schematic interaction diagram of a communication method according to an embodiment of the present disclosure.
Figure 4B:
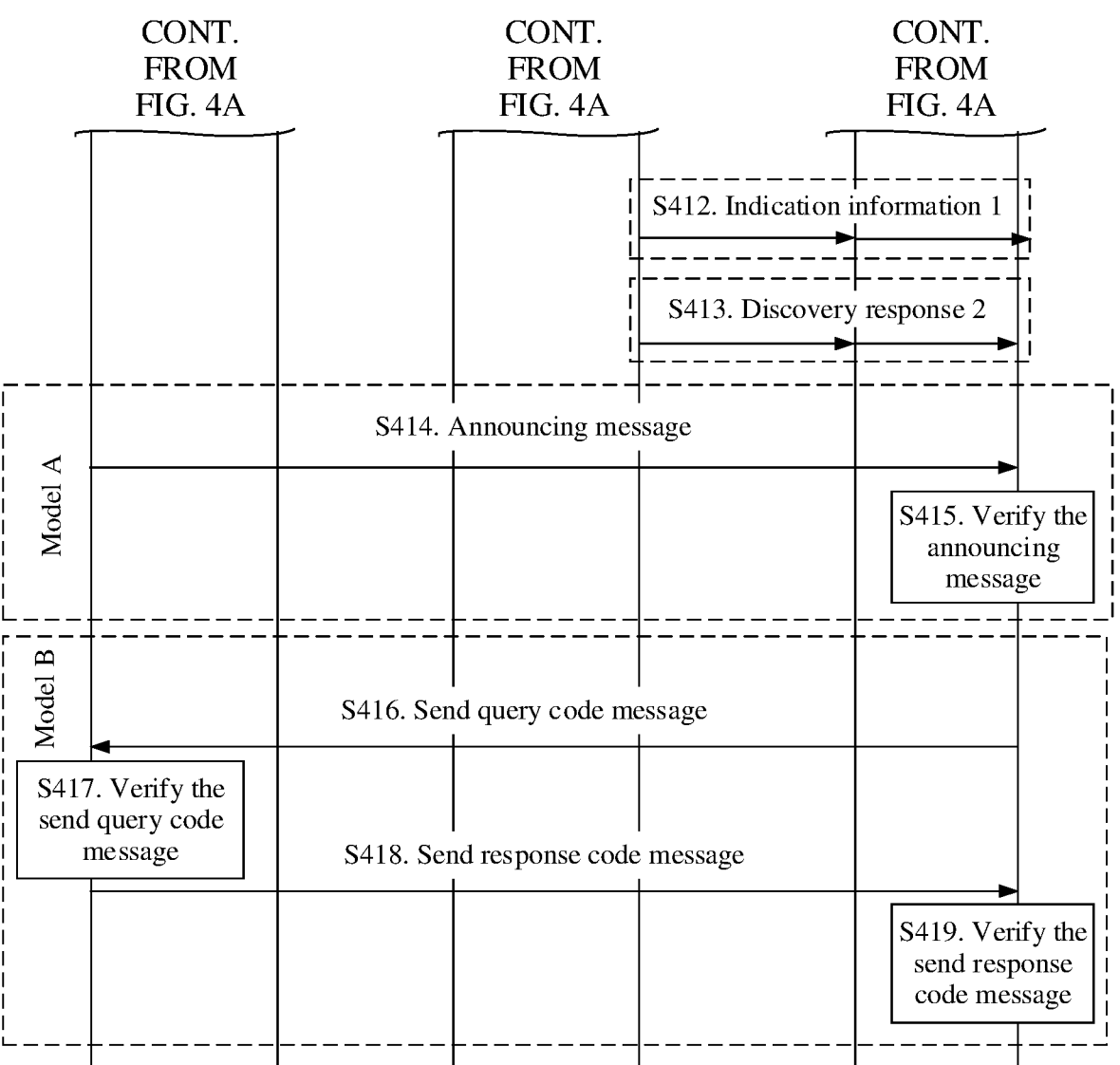

For example, an embodiment of the present disclosure provides a communication method. In the communication method, the architecture of the ProSe control plane in the 5G network shown in FIG. 2 is used as an example, and security parameter matching is performed based on a discovery scenario of restricted discovery and by using a discovery parameter obtaining procedure in a ProSe discovery procedure. As shown in FIG. 4A and FIG. 4B, the communication method includes the following steps.

S401. A terminal device 1 sends a discovery request 1 to an AMF network element 1. Correspondingly, the AMF network element 1 receives the discovery request 1 from the terminal device 1. The discovery request 1 includes one or more of the following: 3GPP identity information of the terminal device 1, identity information (user identity) for a ProSe service, a discovery mode, a discovery command, a discovery type, and an application identifier (application ID).

Optionally, in this embodiment, the 3GPP identity information of the terminal device 1 may be, for example, one of a subscription concealed identifier (SUCI), a 5G-globally unique temporary identifier (GUTI), a generic public subscription identifier (GPSI), or a permanent equipment identifier (PEI).

For related descriptions of the discovery type, the discovery mode, the discovery command, or the user identity for the ProSe service, refer to a description part of a preface of the specific embodiments.

Optionally, the foregoing parameter in the discovery request 1 in this embodiment may be included in a container of a non-access stratum (NAS) message. In this way, security of a security capability of the terminal device 1 can be ensured because an intermediate node transparently transmits the container without tampering with content in the container. In addition, because the AMF network element 1 may not parse the foregoing parameter, processing resources of the AMF network element 1 can be saved, and processing efficiency of the AMF network element 1 can be improved.

It should be noted that, in this embodiment, even if the foregoing parameter may be included in the container, the 3GPP identity information of the terminal device 1 is always included outside the container. For example, when sending the discovery request 1 to the AMF network element 1, the terminal device 1 includes the 3GPP identity information of the terminal device 1 in the container, and also includes the 3GPP identity information of the terminal device 1 outside the container.

Optionally, the discovery request 1 in this embodiment may further include the security capability of the terminal device 1. For related descriptions of the security capability, refer to the description part of the preface of the specific embodiments.

In a possible implementation, the security capability of the terminal device 1 may be included in the container of the NAS message. In this way, the security of the security capability of the terminal device 1 can be ensured because the intermediate node transparently transmits the container without tampering with the content in the container. In addition, because the AMF network element 1 does not need to parse the security capability of the first device, the processing resources of the AMF network element 1 can be saved, and the processing efficiency of the AMF network element 1 can be improved.

In a possible implementation, the security capability of the terminal device 1 may be included outside the container of the NAS message. In this way, when the AMF network element 1 needs to obtain the security capability of the terminal device 1, the AMF network element 1 may directly obtain, outside the container of the NAS message, the security capability of the terminal device 1. This saves a step in which the AMF network element 1 obtains the security capability of the terminal device 1 from a security context of the terminal device 1, and improves the processing efficiency of the AMF network element 1.

Optionally, the discovery request 1 in this embodiment may further include a security policy of the terminal device 1. For related descriptions of the security policy, refer to the description part of the preface of the specific embodiments.

In a possible implementation, the security policy of the terminal device 1 may be included in the container of the NAS message. In this way, security of the security policy of the terminal device 1 can be ensured because the intermediate node transparently transmits the container without tampering with the content in the container. In addition, processing logic of the AMF network element 1 can be simplified because the AMF network element 1 does not need to parse the security policy of the terminal device 1.

Optionally, the terminal device 1 in this embodiment may be, for example, announcing UE in Model A or discoveree UE in Model B. Correspondingly, the following terminal device 2 may be monitoring UE in Model A or discoverer UE in Model B.

S402. The AMF network element 1 sends a discovery request 2 to a DDNMF network element 1. Correspondingly, the DDNMF network element 1 receives the discovery request 2 from the AMF network element 1. The discovery request 2 includes one or more of the following: a subscription permanent identifier (SUPI) of the terminal device 1, the identity information (user identity) for the ProSe service, the discovery mode, the discovery command, the discovery type, and the application identifier (application ID).

It should be noted that, in this embodiment, parameters such as the identity information (user identity) for the ProSe service, the discovery mode, the discovery command, the discovery type, and the application identifier (application ID) included in the discovery request 2 are obtained from the discovery request 1. For details, refer to conventional technology.

In this embodiment, the SUPI of the terminal device 1 that is included in the discovery request 2 is obtained through conversion based on the 3GPP identity information of the terminal device 1 that is in the discovery request 1. For a specific conversion method, refer to conventional technology.

Optionally, in this embodiment, the foregoing parameter in the discovery request 2 may be included in the container of the NAS message, so that the intermediate node transparently transmits the container without tampering with content in the container.

In addition, in this embodiment, the discovery request 2 further includes the security capability of the terminal device 1.

In a possible implementation, in this embodiment, the security capability of the terminal device 1 that is included in the discovery request 2 is obtained from the discovery request 1. That is, the AMF network element 1 forwards the security capability of the terminal device 1. This implementation corresponds to the following scenario 1 and scenario 2.

Scenario 1: A standard specifies that the security capability of the terminal device 1 is reported by the terminal device 1 (that is, the discovery request 1 includes the security capability of the terminal device 1), and the security capability of the terminal device 1 is included in the container of the NAS message. In this case, the AMF network element 1 does not need to determine whether the discovery request 1 includes the security capability of the terminal device 1, but directly forwards the security capability of the terminal device 1 that is included in the discovery request 1. In this solution, the processing logic of the AMF network element 1 can be simplified because the AMF network element 1 does not need to check whether the security capability is carried.

Scenario 2: A protocol does not specify that the security capability of the terminal device 1 needs to be reported by the terminal device 1. In this case, after obtaining the discovery request 1, the AMF network element 1 determines whether the discovery request 1 includes the security capability of the terminal device 1, for example, checks whether the security capability of the terminal device 1 is included outside the container of the NAS message. If the AMF network element 1 determines that the discovery request 1 includes the security capability of the terminal device 1, the AMF network element 1 forwards the security capability of the terminal device 1. The solution is flexible because it is not limited that the security capability of the terminal device 1 needs to be reported by the terminal device 1.

In another possible implementation, in this embodiment, the security capability of the terminal device 1 that is included in the discovery request 2 is obtained by the AMF network element 1 from a context of the terminal device 1 by searching for, based on the 3GPP identity information of the terminal device 1, the context of the terminal device 1 that is stored on the AMF network element 1. This implementation corresponds to the following scenario 3 and scenario 4:

Scenario 3: The protocol does not specify that the security capability of the terminal device 1 needs to be reported by the terminal device 1. In this case, after obtaining the discovery request 1, the AMF network element 1 determines whether the discovery request 1 includes the security capability of the terminal device 1, for example, checks whether the security capability of the terminal device 1 is included outside the container of the NAS message. If the AMF network element 1 determines that the discovery request 1 does not include the security capability of the terminal device 1, the AMF network element 1 obtains the security capability of the terminal device 1 in the foregoing manner, and sends the security capability of the terminal device 1 to the DDNMF network element 1 by including the security capability of the terminal device 1 outside the container of the NAS message. The solution is flexible because it is not limited that the security capability of the terminal device 1 needs to be reported by the terminal device 1.

Scenario 4: The protocol does not specify that the security capability of the terminal device 1 needs to be reported by the terminal device 1. In this case, after obtaining the discovery request 1, the AMF network element 1 does not need to determine whether the discovery request 1 includes the security capability of the terminal device 1, but directly obtains the security capability of the terminal device 1 in the foregoing manner, and sends the security capability of the terminal device 1 to the DDNMF network element 1 by including the security capability of the terminal device 1 outside the container of the NAS message. In this solution, the security capability of the terminal device 1 that is obtained by the DDNMF network element 1 can be more accurate because the security capability of the terminal device 1 is obtained from the network side. In addition, in this solution, the processing logic of the AMF network element 1 can be simplified because the AMF network element 1 does not need to check whether the security capability is carried.

Optionally, in this embodiment, when the discovery request 1 includes the security policy of the terminal device 1, the AMF network element 1 further forwards the security policy of the terminal device 1. In other words, correspondingly, the discovery request 2 includes the security policy of the terminal device 1.

Steps S401 and S402 are described by using an example in which the terminal device 1 accesses the DDNMF network element 1 using a control plane procedure. Optionally, in this embodiment, the terminal device 1 may alternatively access the DDNMF network element 1 through a user plane. This is not specifically limited in this embodiment. In a process in which the terminal device 1 sends the discovery request to the DDNMF network element 1 through the user plane, the discovery request 1 and the discovery request 2 are a same request message. The 3GPP identity information of the terminal device 1 may be converted through "translation" by a NEF network element or another network element into the SUPI of the terminal device 1. Alternatively, if the 3GPP identity information of the terminal device 1 that is obtained by the DDNMF network element 1 does not include the SUPI, the DDNMF network element 1 may further obtain the SUPI of the terminal device 1 through interaction with a corresponding UDM network element 1 (not shown in the figure). For example, the DDNMF network element 1 sends a UE ID request message to the UDM network element 1. The UE ID request message includes the 3GPP identity information (for example, a GPSI or a PEI) of the terminal device 1. After receiving the UE ID request message from the DDNMF network element 1, and determining the SUPI of the terminal device 1 based on the 3GPP identity information (for example, an SUCI) of the terminal device 1, the UDM network element 1 sends the SUPI of the terminal device 1 to the DDNMF network element 1.

Optionally, in this embodiment, if the terminal device 1 accesses the DDNMF network element 1 through the user plane, when the discovery request sent by the terminal device 1 does not include the security capability of the terminal device 1, the DDNMF network element 1 may interact with the AMF network element 1 by using the 3GPP identity information of the terminal device 1, to obtain security capability of the terminal device 1. This is not specifically limited in this embodiment.

Optionally, in this embodiment, if the terminal device 1 accesses the DDNMF network element 1 using the control plane procedure, identity information such as an SUCI or a 5G-GUTI may be used as the 3GPP identity information of the terminal device 1. If the terminal device 1 accesses the DDNMF network element 1 using the user plane procedure, identity information such as a GPSI or a PEI may be used as the 3GPP identity information of the terminal device 1.

Optionally, the discovery request (including the discovery request 1 and the discovery request 2) in this embodiment may include one or more user identities for a ProSe service, that is, the terminal device 1 may request a plurality of pieces of ProSe service discovery authorization and corresponding discovery parameters at the same time. This is not specifically limited in this embodiment.

S403. The DDNMF network element 1 performs a ProSe discovery authorization check on the terminal device 1 based on the user identity for the ProSe service and/or the application identifier sent by the terminal device 1.

Optionally, in this embodiment, the DDNMF network element 1 may determine a corresponding proximity-based services application server (ProSe app server) based on the application identifier, and notify the DDNMF network element 1 after the ProSe app server completes the authorization check. In this embodiment, the authorization check by the ProSe app server is used to verify whether the terminal device 1 can legally use the ProSe service.

Optionally, in this embodiment, if the terminal device 1 carries the plurality of user identities for the ProSe service, based on the foregoing descriptions, the DDNMF network element 1 needs to separately perform the ProSe service discovery authorization check on the terminal device 1 based on each user identity for the ProSe service. The plurality of pieces of authorization may be separately performed, or may be performed together.

S404. After the ProSe service discovery authorization check succeeds, the DDNMF network element 1 obtains the security policy and the discovery parameter of the terminal device 1.

In this embodiment, a manner in which the terminal device 1 obtains the security policy of the terminal device 1 includes: obtaining the security policy from the discovery request 2, and/or obtaining, based on the SUPI of the terminal device 1, the security policy from a PCF network element 1 (or another network element) corresponding to the terminal device 1.

The following describes how to obtain the security policy in two scenarios:

Scenario 1: The DDNMF network element 1 determines that the discovery request 2 does not include the security policy of the terminal device 1.

The DDNMF network element 1 may obtain, based on the SUPI of the terminal device 1, the security policy of the terminal device 1 from the first PCF network element (or another network element) corresponding to the terminal device 1. The security policy may include one or more protection policies. For details, refer to the description part of the preface of the specific embodiments.

Scenario 2: The DDNMF network element 1 determines that the discovery request 2 includes the security policy of the terminal device 1.

In a possible implementation, if the security policy of the terminal device 1 that is in the discovery request 2 includes a user plane confidentiality protection policy and an integrity protection policy in a PC5 connection, the DDNMF network element 1 may obtain the user plane confidentiality protection policy and the integrity protection policy in the PC5 connection from the discovery request 2. Correspondingly, the security policy of the terminal device 1 that is obtained by the DDNMF network element 1 includes the user plane confidentiality protection policy and the integrity protection policy in the PC5 connection. In this solution, processing logic of the DDNMF network element 1 can be simplified because the DDNMF network element 1 does not need to obtain the security policy of the terminal device 1 from another network element.

In another possible implementation, if the security policy of the terminal device 1 that is in the discovery request 2 includes the user plane confidentiality protection policy and the integrity protection policy in the PC5 connection, the DDNMF network element 1 may obtain the user plane confidentiality protection policy and the integrity protection policy in the PC5 connection from the discovery request 2, and obtain, based on the SUPI of the terminal device 1, a control plane confidentiality protection policy and an integrity protection policy in the PC5 connection from the PCF network element 1 (or another network element) corresponding to the terminal device 1. Correspondingly, the security policy of the terminal device 1 that is obtained by the DDNMF network element 1 includes the user plane confidentiality protection policy and the integrity protection policy in the PC5 connection, and the control plane confidentiality protection policy and/or the integrity protection policy in the PC5 connection. The solution is flexible because it is not limited that the terminal device 1 needs to report a control plane security policy in the PC5 connection.

It should be noted that the scenario 2 provides only two possible implementations as examples. Certainly, as described in the preface part of the specific embodiments, the security policy in this embodiment includes at least one protection policy. When the DDNMF network element 1 determines that the discovery request 2 includes at least one protection policy, the DDNMF network element 1 may obtain the at least one protection policy only from the discovery request 2. In other words, the security policy of the terminal device 1 that is obtained by the DDNMF network element 1 includes the at least one protection policy carried in the discovery request 2. Alternatively, the DDNMF network element 1 may obtain the at least one protection policy from the discovery request 2, and obtain, based on the SUPI of the terminal device 1 from the first PCF network element (or another network element) corresponding to the terminal device 1, one or more protection policies not included in the discovery request 2. In other words, the security policy of the terminal device 1 that is obtained by the DDNMF network element 1 includes the at least one protection policy carried in the discovery request 2 and the one or more protection policies that are not included in the discovery request 2 and that are obtained from the PCF network element 1 (or another network element) corresponding to the terminal device 1. A manner in which the DDNMF network element 1 obtains the security policy of the terminal device 1 is not specifically limited in this embodiment.

Optionally, in this embodiment, in the scenario 2, to be specific, in a scenario in which the discovery request 2 includes the security policy of the terminal device 1, the DDNMF network element 1 may alternatively ignore the security policy of the terminal device 1 that is included in the discovery request 2, but obtain, based on the SUPI of the terminal device 1, the security policy of the terminal device 1 from the PCF network element 1 (or another network element) corresponding to the terminal device 1. This is not specifically limited in this embodiment. In this solution, the security policy of the terminal device 1 that is obtained by the DDNMF network element 1 can be more accurate because the security policy of the terminal device 1 is synchronously obtained from the network side. In addition, in this solution, the processing logic of the DDNMF network element 1 can be simplified because the DDNMF network element 1 does not need to check whether the security policy is carried.

In this embodiment, for example, the discovery parameter of the terminal device 1 may be shown in Table 1.

TABLE 1

|  | Model A | Model B |
|---|---|---|
| Code for ProSe discovery | ProSe Restricted Code | ProSe Response Code |
| Discovery parameter container | Code-Send-SecParams | Code-Send-SecParams Code-Rcv-SecParams |
| Discovery time restricted parameter | CURRENT_TIME, MAX_OFFSET | |

In Model A, Code-Send-SecParams includes a discovery parameter for protecting ProSe Restricted Code in a discovery procedure on the PC5 interface. In Model B, Code-Send-SecParams includes a discovery parameter for protecting ProSe Response Code in the discovery procedure on the PC5 interface, and Code-Rcv-SecParams includes a discovery parameter for obtaining, in the discovery procedure on the PC5 interface, the code for ProSe discovery that is sent by the peer end. For related descriptions of the discovery parameters in Table 1, refer to existing standards 3GPP TS 23.303, v15.1.0 and 3GPP TS 33.303, v15.0.0.

It should be noted that, in this embodiment, a discovery scenario of restricted discovery is used as an example for description. In a discovery scenario of open discovery, the discovery parameter of the terminal device 1 is different from that in Table 1, and details are shown in Table 2.

TABLE 2

| | Model A |
|---|---|
| Code for ProSe discovery | ProSe Application Code |
| Discovery parameter | Discovery Key |
| Discovery time restricted parameter | CURRENT_TIME, MAX_OFFSET |

Discovery Key includes a discovery parameter for protecting ProSe Application Code in the discovery procedure, that is, the code for protecting ProSe discovery on the PC5 interface in the discovery parameter. For related descriptions of the discovery parameter in Table 2, refer to existing standards 3GPP TS 23.303, v15.1.0 and 3GPP TS 33.303, v15.0.0.

S405. The DDNMF network element 1 sends a discovery response 1 to the terminal device 1 via the AMF network element 1. Correspondingly, the terminal device 1 receives the discovery response 1 from the DDNMF network element 1 via the AMF network element 1.

The discovery response 1 includes the code for ProSe discovery, the discovery parameter container of the terminal device 1, and the discovery time restricted parameter.

Optionally, the discovery response 1 in this embodiment may further include the security capability of the terminal device 1. After obtaining the security capability of the terminal device 1, the terminal device 1 may store the security capability of the terminal device 1. In a possible implementation, that the terminal device 1 stores the security capability of the terminal device 1 includes: The terminal device 1 determines whether the security capability of the terminal device 1 has been stored on the terminal device 1. The terminal device 1 stores the security capability of the terminal device 1 if the security capability of the terminal device 1 has not been stored. If the security capability of the terminal device 1 has been stored, the terminal device 1 updates the stored security capability of the terminal device 1 via the security capability in the discovery response 1.

Further, optionally, in this embodiment, before the DDNMF network element 1 sends the security capability of the terminal device 1 to the terminal device 1, the DDNMF network element 1 may check whether the security capability of the terminal device 1 that is included in the discovery request 2 is the same as the security capability of the terminal device 1 that is stored on the DDNMF network element 1. If they are different or the DDNMF network element 1 does not store the security capability of the terminal device 1, the DDNMF network element 1 sends the security capability of the terminal device 1 to the terminal device 1. Otherwise, the DDNMF network element 1 may not need to send the security capability of the terminal device 1 to the terminal device 1. This can avoid a waste of signaling resource.

Optionally, the discovery response 1 in this embodiment may further include the security policy of the terminal device 1 that is obtained by the DDNMF network element 1. After obtaining the security policy of the terminal device 1, the terminal device 1 may store the security policy of the terminal device 1. In a possible implementation, that the terminal device 1 stores the security policy of the terminal device 1 includes: The terminal device 1 determines whether the security policy of the terminal device 1 has been stored on the terminal device 1. The terminal device 1 stores the security policy of the terminal device 1 if the security policy of the terminal device 1 has not been stored. If the security policy of the terminal device 1 has been stored, the terminal device 1 updates the stored security policy of the terminal device 1 via the security policy in the discovery response 1.

Further, optionally, in this embodiment, in correspondence to the scenario 2 in step S404 (to be specific, the DDNMF network element 1 determines that the discovery request 2 includes the security policy of the terminal device 1), if the standard does not limit that the DDNMF network element 1 can obtain the security policy of the terminal device 1 only from the discovery request 2, before the DDNMF network element 1 sends the security policy of the terminal device 1 to the terminal device 1, the DDNMF network element 1 may determine whether the obtained security policy of the terminal device 1 is the same as the security policy of the terminal device 1 that is in the discovery request 2. If they are different, the DDNMF network element 1 sends the security policy of the terminal device 1 to the terminal device 1. Otherwise, the DDNMF network element 1 may not need to send the security policy of the terminal device 1 to the terminal device 1. This can avoid a waste of signaling resource. Certainly, if the standard specifies that the DDNMF network element 1 can obtain the security policy of the terminal device 1 only from the discovery request 2, the discovery response 2 in this embodiment does not need to include the security policy of the terminal device 1.

Optionally, in this embodiment, the terminal device 1 may alternatively obtain the discovery response 1 from the DDNMF network element 1 through the user plane. This is not specifically limited in this embodiment.

Steps S401 to S404 are a procedure of obtaining the discovery parameter, the security policy, and the security capability of the terminal device 1. The following provides a procedure of obtaining a discovery parameter, a security policy, and a security capability of the terminal device 2 by using steps S406 to S409.

S406. The terminal device 2 sends a discovery request 3 to an AMF network element 2. Correspondingly, the AMF network element 2 receives the discovery request 3 from the terminal device 2. The discovery request 3 includes one or more of the following: 3GPP identity information of the terminal device 2, identity information (user identity) for a ProSe service, a discovery mode, a discovery command, a discovery type, and an application identifier (application ID).

S407. The AMF network element 2 sends a discovery request 4 to a DDNMF network element 2. Correspondingly, the DDNMF network element 2 receives the discovery request 4 from the AMF network element 2. The discovery request 4 includes one or more of an SUPI of the terminal device 2, a user identity for a ProSe service, a discovery mode, a discovery command, a discovery type, or an application identifier. In addition, in this embodiment, the discovery request 4 further includes the security capability of the terminal device 2.

S408. The DDNMF network element 2 performs a ProSe discovery authorization check on the terminal device 2 based on the user identity for the ProSe service and/or the application identifier sent by the terminal device 2.

S409. After the ProSe service discovery authorization check succeeds, the DDNMF network element 2 obtains the security policy and the discovery parameter of the terminal device 2.

In this embodiment, for example, the discovery parameter of the terminal device 2 may be shown in Table 3.

TABLE 3

|                                          | Model A             | Model B             |
|------------------------------------------|---------------------|---------------------|
| Code for ProSe discovery                 | ProSe Restricted Code | ProSe Query Code    |
| Discovery parameter container            | Code-Rcv-SecParams  | Code-Send-SecParams Code-Rcv-SecParams |
| Discovery time restricted parameter      | CURRENT_TIME, MAX_OFFSET |                  |

In Model A, Code-Rcv-SecParams includes a discovery parameter for protecting ProSe Restricted Code in the discovery procedure on the PC5 interface. In Model B, Code-Send-SecParams includes a discovery parameter for protecting ProSe Query code in the discovery procedure on the PC5 interface, and Code-Rcv-SecParams includes a discovery parameter for obtaining, in the discovery procedure on the PC5 interface, a code for ProSe discovery that is sent by a peer end, that is, the code for protecting ProSe discovery on the PC5 interface in the discovery parameter. For related descriptions of the discovery parameter in Table 3, refer to existing standards 3GPP TS 23.303, v15.1.0 and 3GPP TS 33.303, v15.0.0.

It should be noted that, in this embodiment, a discovery scenario of restricted discovery is used as an example for description. In a discovery scenario of open discovery, the discovery parameter of the terminal device 2 is different from that in Table 3, and details are shown in Table 4.

TABLE 4

|                                      | Model A             |
|--------------------------------------|---------------------|
| Code for ProSe discovery             | ProSe Application Code |
| Discovery time restricted parameter  | CURRENT_TIME, MAX_OFFSET |

It should be noted that, in the discovery scenario of open discovery, the terminal device 2 does not need a corresponding discovery key, and decryption depends on a match report process. In other words, in this case, the terminal device 2 does not have a corresponding discovery parameter. For related descriptions, refer to existing standards 3GPP TS 23.303, v15.1.0 and 3GPP TS 33.303, v15.0.0.

For specific implementation of steps S406 to S409, refer to steps S401 to S404. A difference lies in that, for example, the terminal device 1 in steps S401 to S404 is replaced with the terminal device 2 in steps S406 to S409, the DDNMF network element 1 in steps S401 to S404 is replaced with the DDNMF network element 2 in steps S406 to S409, the AMF network element 1 in steps S401 to S404 is replaced with the AMF network element 2 in steps S406 to S409, the UDM network element 1 in steps S401 to S404 is replaced with a UDM network element 2 in steps S406 to S409, the PCF network element 1 in steps S401 to S404 is replaced with a PCF network element 2 in steps S406 to S409, the discovery request 1 in steps S401 to S404 is replaced with the discovery request 3 in steps S406 to S409, the discovery request 2 in steps S401 to S404 is replaced with the discovery request 4 in steps S406 to S409, and the like. In addition, it should be noted that, in steps S406 to S409, when the DDNMF network element 2 performs the ProSe service discovery authorization check on the terminal device 2, the proximity-based services application server may determine, based on the user identity for the ProSe service that is sent by the terminal device 2, a user identity for a ProSe service that is sent by a terminal device of a same ProSe service, and send the user identity to the terminal device 2, so that the terminal device 2 performs other discovery subsequently. This is not specifically limited in this embodiment.

In addition, in this embodiment, in a process in which the DDNMF network element 2 performs the ProSe service discovery authorization check on the terminal device 2, the DDNMF network element 2 may further obtain the user identity for the ProSe service that corresponds to the terminal device 1. For details, refer to conventional technology.

S410. The DDNMF network element 2 obtains a security parameter of the terminal device 1 from the DDNMF network element 1. A security parameter is required for establishing a PC5 connection between the terminal device 1 and the terminal device 2. The security parameter in this embodiment includes a security policy and/or a security capability. This is uniformly described herein.

In this embodiment, the DDNMF network element 2 may determine the DDNMF network element 1 based on the user identity for the ProSe service that corresponds to the terminal device 1 and that is obtained in step S409.

In a possible implementation, in this embodiment, that the DDNMF network element 2 obtains the security policy of the terminal device 1 from the DDNMF network element 1 includes: The DDNMF network element 2 sends a request message to the DDNMF network element 1. The request message includes the user identity for the ProSe service and the application identifier sent by the terminal device 2 and the user identity for the ProSe service that is sent by the terminal device 1. The request message is used to request the security parameter of the terminal device 1 from the DDNMF network element 1. After receiving the request message, the DDNMF network element 1 may send a corresponding response message to the DDNMF network element 2. The response message includes the security parameter of the terminal device 1.

S411. The DDNMF network element 2 determines, based on whether the security parameter of the terminal device 1 matches a security parameter of the terminal device 2, whether the terminal device 1 and the terminal device 2 support mutual communication.

In this embodiment, that the DDNMF network element 2 determines, based on whether the security parameter of the terminal device 1 matches a security parameter of the terminal device 2, whether the terminal device 1 and the terminal device 2 support mutual communication includes:

When the security parameter of the terminal device 1 does not match the security parameter of the terminal device 2, the DDNMF network element 2 determines that the terminal device 1 and the terminal device 2 do not support mutual communication; or when the security parameter of the terminal device 1 matches the security parameter of the terminal device 2, the DDNMF network element 2 determines that the terminal device 1 and the terminal device 2 support mutual communication.

In a possible implementation, the security parameter in this embodiment includes the security policy. That the security parameter of the terminal device 1 matches the security parameter of the terminal device 2 means that the security policy of the terminal device 1 matches the security policy of the terminal device 2. That the security parameter of the terminal device 1 does not match the security parameter of the terminal device 2 means that the security policy of the terminal device 1 does not match the security policy of the terminal device 2.

In a possible implementation, the security parameter in this embodiment includes the security capability. That the security parameter of the terminal device 1 matches the security parameter of the terminal device 2 means that the security capability of the terminal device 1 matches the security capability of the terminal device 2. That the security parameter of the terminal device 1 does not match the security parameter of the terminal device 2 means that the security capability of the terminal device 1 does not match the security capability of the terminal device 2.

In a possible implementation, the security parameter in this embodiment includes the security capability and the security policy. That the security parameter of the terminal device 1 matches the security parameter of the terminal device 2 means that the security capability of the terminal device 1 matches the security capability of the terminal device 2, and the security policy of the terminal device 1 matches the security policy of the terminal device 2. Otherwise, it is considered that the security parameter of the terminal device 1 does not match the security parameter of the terminal device 2.

For related descriptions of whether the security capabilities match or whether the security policies match, refer to the part of the preface of the specific embodiments.

Further, in this embodiment, if determining that the terminal device 1 and the terminal device 2 do not support mutual communication, the DDNMF network element 2 performs step S412. Otherwise, the DDNMF network element 2 performs step S413.

S412. The DDNMF network element 2 sends indication information 1 to the terminal device 2 via the AMF network element 2. Correspondingly, the terminal device 2 receives the indication information 1 from the DDNMF network element 2 via the AMF network element 2. The indication information 1 indicates that the terminal device 1 and the terminal device 2 do not support mutual communication.

S413. The DDNMF network element 2 sends a discovery response 2 to the terminal device 2 via the AMF network element 2. Correspondingly, the terminal device 2 receives the discovery response 2 from the DDNMF network element 2 via the AMF network element 2.

The discovery response 2 includes the code for ProSe discovery, the discovery parameter of the terminal device 2, and the discovery time restricted parameter.

Optionally, the discovery response 2 in this embodiment may further include the security capability of the terminal device 2. After obtaining the security capability of the terminal device 2, the terminal device 2 may store the security capability of the terminal device 2. In a possible implementation, that the terminal device 2 stores the security capability of the terminal device 2 includes: The terminal device 2 determines whether the security capability of the terminal device 2 has been stored on the terminal device 2. The terminal device 2 stores the security capability of the terminal device 2 if the security capability of the terminal device 2 has not been stored. If the security capability of the terminal device 2 has been stored, the terminal device 2 updates the stored security capability of the terminal device 2 via the security capability in the discovery response 2.

Further, optionally, in this embodiment, before the DDNMF network element 2 sends the security capability of the terminal device 2 to the terminal device 2, the DDNMF network element 2 may check whether the security capability of the terminal device 2 that is included in the discovery request 4 is the same as the security capability of the terminal device 2 that is stored on the DDNMF network element 2. If they are different or the DDNMF network element 2 does not store the security capability of the terminal device 2, the DDNMF network element 2 sends the security capability of the terminal device 2 to the terminal device 2. Otherwise, the DDNMF network element 2 may not need to send the security capability of the terminal device 2 to the terminal device 2. This can avoid a waste of signaling resource.

Optionally, the discovery response 2 in this embodiment may further include the security policy of the terminal device 2 that is obtained by the DDNMF network element 2. After obtaining the security policy of the terminal device 2, the terminal device 2 may store the security policy of the terminal device 2. In a possible implementation, that the terminal device 2 stores the security policy of the terminal device 2 includes: The terminal device 2 determines whether the security policy of the terminal device 2 has been stored on the terminal device 2. The terminal device 2 stores the security policy of the terminal device 2 if the security policy of the terminal device 2 has not been stored. If the security policy of the terminal device 2 has been stored, the terminal device 2 updates the stored security policy of the terminal device 2 by using the security policy in the discovery response 2.

Further, optionally, in this embodiment, in a scenario in which the DDNMF network element 2 determines that the discovery request 4 includes the security policy of the terminal device 2, if the standard does not specify that the DDNMF network element 2 can obtain the security policy of the terminal device 2 only from the discovery request 4, before the DDNMF network element 2 sends the security policy of the terminal device 2 to the terminal device 2, the DDNMF network element 2 may determine whether the obtained security policy of the terminal device 2 is the same as the security policy of the terminal device 2 that is in the discovery request 4. If they are different, the DDNMF network element 2 sends the security policy of the terminal device 2 to the terminal device 2. Otherwise, the DDNMF network element 2 may not need to send the security policy of the terminal device 2 to the terminal device 2. This can avoid a waste of signaling resource. Certainly, if the standard specifies that the DDNMF network element 2 can obtain the security policy of the terminal device 2 only from the discovery request 4, the discovery response 2 in this embodiment does not need to include the security policy of the terminal device 2.

Optionally, in this embodiment, the terminal device 2 may alternatively obtain the discovery response 2 from the DDNMF network element 2 through the user plane. This is not specifically limited in this embodiment.

It should be noted that the foregoing steps S410 and S411 are described by using an example in which the DDNMF network element 2 determines whether the terminal device 1 and the terminal device 2 support mutual communication. Optionally, in this embodiment, the DDNMF network element 1 may alternatively obtain the security parameter of the terminal device 1 from the DDNMF network element 2. A security parameter is required for establishing the PC5 connection between the terminal device 1 and the terminal device 2. In this way, the DDNMF network element 1 determines, based on whether the security parameter of the terminal device 1 matches the security parameter of the terminal device 2, whether the terminal device 1 and the terminal device 2 support mutual communication. An implementation is similar to steps S410 and S411.

Further, the DDNMF network element 1 may send indication information 2 to the DDNMF network element 2 if the DDNMF network element 1 determines that the terminal device 1 and the terminal device 2 do not support mutual communication. The indication information 2 indicates that the terminal device 1 and the terminal device 2 do not support mutual communication. The DDNMF network element 2 continues to perform step S412.

Alternatively, if the DDNMF network element 1 determines that the terminal device 1 and the terminal device 2 support mutual communication, in a possible implementation, the DDNMF network element 1 sends the discovery parameter of the terminal device 1 to the DDNMF network element 2. The discovery parameter implicitly indicates that the terminal device 1 and the terminal device 2 support mutual communication. After obtaining the discovery parameter of the terminal device 1, the DDNMF network element 2 continues to perform step S413. In another possible implementation, the DDNMF network element 1 sends the discovery parameter of the terminal device 1 and indication information 3 to the DDNMF network element 2. The indication information 3 indicates that the terminal device 1 and the terminal device 2 support mutual communication. The DDNMF network element 2 continues to perform step S413 based on the indication information 3. This is not specifically limited in this embodiment.

Optionally, in this embodiment, if the DDNMF network element 2 determines that the terminal device 1 and the terminal device 2 support mutual communication, the DDNMF network element 2 may further determine a security protection method and a used security protection algorithm for the PC5 connection between the terminal device 1 and the terminal device 2. Further, the second DDNMF may send the selected security protection method and the used security protection algorithm to the DDNMF network element 1, and the DDNMF network element 1 sends the selected security protection method and the used security protection algorithm to the terminal device 1. If the DDNMF network element 1 determines that the terminal device 1 and the terminal device 2 support mutual communication, the DDNMF network element 1 may further determine the security protection method and the used security protection algorithm for the PC5 connection between the terminal device 1 and the terminal device 2. The DDNMF network element 1 sends the selected security protection method and the used security protection algorithm to the terminal device 1. This is not specifically limited in this embodiment.

Optionally, in this embodiment, if the DDNMF network element 2 determines that the terminal device 1 and the terminal device 2 support mutual communication, the DDNMF network element 2 may further determine the security protection method and the used security protection algorithm for the PC5 connection between the terminal device 1 and the terminal device 2. Further, the second DDNMF may send the selected security protection method and the used security protection algorithm to the terminal device 2 (for example, by using the discovery response 2). If the DDNMF network element 1 determines that the terminal device 1 and the terminal device 2 support mutual communication, the DDNMF network element 1 may further determine the security protection method and the used security protection algorithm for the PC5 connection between the terminal device 1 and the terminal device 2. The DDNMF network element 1 sends the selected security protection method and the used security protection algorithm to the DDNMF network element 2. The DDNMF network element 2 sends the selected security protection method and the used security protection algorithm to the terminal device 2. This is not specifically limited in this embodiment.

Further, in this embodiment, after step S413, a discovery announcing procedure may be further performed.

A discovery scenario of Model A is used as an example. The communication method provided in this embodiment may further include the following steps S414 and S415.

S414. The terminal device 1 sends an announcing message to the terminal device 2. Correspondingly, the terminal device 2 receives the announcing message from the terminal device 1.

Optionally, the announcing message in this embodiment may include the security parameter of the terminal device 1. The security parameter of the terminal device 1 is used to further assist the terminal device 2 in determining whether subsequent communication can be established. This is not specifically limited in this embodiment.

In a possible implementation, a protection method for the announcing message in this embodiment may comply with a discovery parameter indication in the conventional technology. For details, refer to the conventional technology.

In another possible implementation, if the terminal device 1 obtains the security protection method and the used security protection algorithm for the PC5 connection between the terminal device 1 and the terminal device 2, the protection method for the announcing message in this embodiment may use the security protection method and the security protection algorithm. For example, the security protection method for the PC5 connection between the terminal device 1 and the terminal device 2 is to enable control plane integrity protection, and use an integrity protection algorithm NIA1. In this case, the integrity protection may be performed on the announcing message by using the NIA1.

S415. The terminal device 2 verifies the announcing message.

For step S415, refer to an existing implementation.

Optionally, in this embodiment, after verifying that the announcing message is accurate, the terminal device 2 may further continue to verify whether the security parameter of the terminal device 1 matches the security parameter of terminal device 2. If the security parameter of the terminal device 1 matches the security parameter of the terminal device 2, subsequent communication continues. If the security parameter of the terminal device 1 does not match the security parameter of the terminal device 2, the connection is disconnected. This is not specifically limited in this embodiment.

A discovery scenario of Model B is used as an example. The communication method provided in this embodiment may further include the following steps S416 to S419.

S416. The terminal device 2 sends a send query code message to the terminal device 1. Correspondingly, the terminal device 1 receives the send query code message from the terminal device 2.

Optionally, the send query code message in this embodiment may include the security parameter of the terminal device 1. The security parameter of the terminal device 1 is used to further assist the terminal device 2 in determining whether subsequent communication can be established. This is not specifically limited in this embodiment.

In a possible implementation, a protection method for the send query code message in this embodiment may comply with a discovery parameter indication in the conventional technology. For details, refer to the conventional technology.

In another possible implementation, if the terminal device 2 obtains the security protection method and the used security protection algorithm for the PC5 connection between the terminal device 1 and the terminal device 2, the protection method for the send query code message in this embodiment may use the security protection method and the security protection algorithm. For example, the security protection method for the PC5 connection between the terminal device 1 and the terminal device 2 is to enable control plane integrity protection, and use an integrity protection algorithm NIA2. In this case, the integrity protection may be performed on the send query code message by using the NIA2.

S417. The terminal device 1 verifies the send query code message.

For step S417, refer to an existing implementation.

Optionally, in this embodiment, after verifying that the send query code message is accurate, the terminal device 1 may further continue to verify whether the security parameter of the terminal device 1 matches the security parameter of the terminal device 2. If the security parameter of the terminal device 1 matches the security parameter of the terminal device 2, subsequent communication continues. If the security parameter of the terminal device 1 does not match the security parameter of the terminal device 2, the connection is disconnected. This is not specifically limited in this embodiment.

Optionally, in this embodiment, if the terminal device 2 provides the security parameter of the terminal device 2, the terminal device 2 may determine the security protection method and the used security protection algorithm for the PC5 connection between the terminal device 1 and the terminal device 2. This is not specifically limited in this embodiment.

S418. The terminal device 1 sends a send response code message to the terminal device 2. Correspondingly, the terminal device 2 receives the send response code message from the terminal device 1.

Optionally, the response code message in this embodiment may include the security protection method and the used security protection algorithm for the PC5 connection between the terminal device 1 and the terminal device 2.

In a possible implementation, a protection method for the send response code message in this embodiment may comply with a discovery parameter indication in the conventional technology. For details, refer to conventional technology.

In another possible implementation, if the terminal device 1 obtains the security protection method and the used security protection algorithm for the PC5 connection between the terminal device 1 and the terminal device 2, the protection method for the send response code message in this embodiment may use the security protection method and the security protection algorithm. For example, the security protection method for the PC5 connection between the terminal device 1 and the terminal device 2 is to enable control plane integrity protection, and use an integrity protection algorithm NIA3. In this case, the integrity protection may be performed on the send response code message by using the integrity protection algorithm NIA3.

S419. The terminal device 2 verifies the send response code message.

For step S419, refer to an existing implementation.

Optionally, in this embodiment, after verifying that the send response code message is accurate, the terminal device 2 may further continue to verify whether the terminal device 2 can meet the security protection method and the used security protection algorithm for the PC5 connection provided by the terminal device 1. If the terminal device 2 can meet the security protection method and the used security protection algorithm for the PC5 connection, communication continues to be established. Otherwise, the connection is disconnected.

Optionally, in this embodiment, after the foregoing procedure of Model A or Model B ends, a match report procedure may be further included. For details, refer to existing standards 3GPP TS 23.303, v15.1.0 and 3GPP TS 33.303, v15.0.0.

Security negotiation is introduced to a PC5 unicast establishment procedure in an existing V2X scenario, and inconsistency between security parameters of terminal devices at two ends leads to a PC5 unicast establishment failure. In this case, because a ProSe discovery procedure is completed, and some steps of the PC5 unicast establishment procedure are also performed, excessive signaling is wasted. In this embodiment, the security parameter of the terminal device 1 may be matched with the security parameter of the terminal device 2 in the ProSe discovery procedure. When the security parameter of the terminal device 1 does not match the security parameter of the terminal device 2, it indicates that the terminal device 1 and the terminal device 2 do not support mutual communication, so that the ProSe discovery procedure between the terminal device 1 and the terminal device 2 can be terminated in time. Therefore, this can avoid a waste of signaling resulting from a PC5 unicast establishment failure due to inconsistency between security parameters of terminal devices at two ends in the PC5 unicast establishment procedure after the ProSe discovery procedure in the conventional technology.

The processor 301 in the communication device 300 shown in FIG. 3 may invoke the application program code stored in the memory 303, to instruct the DDNMF network element 1 or the DDNMF network element 2 to perform an action of the DDNMF network element 1 or the DDNMF network element 2 in steps S401 to S419. This is not limited in this embodiment.

Figure 5:
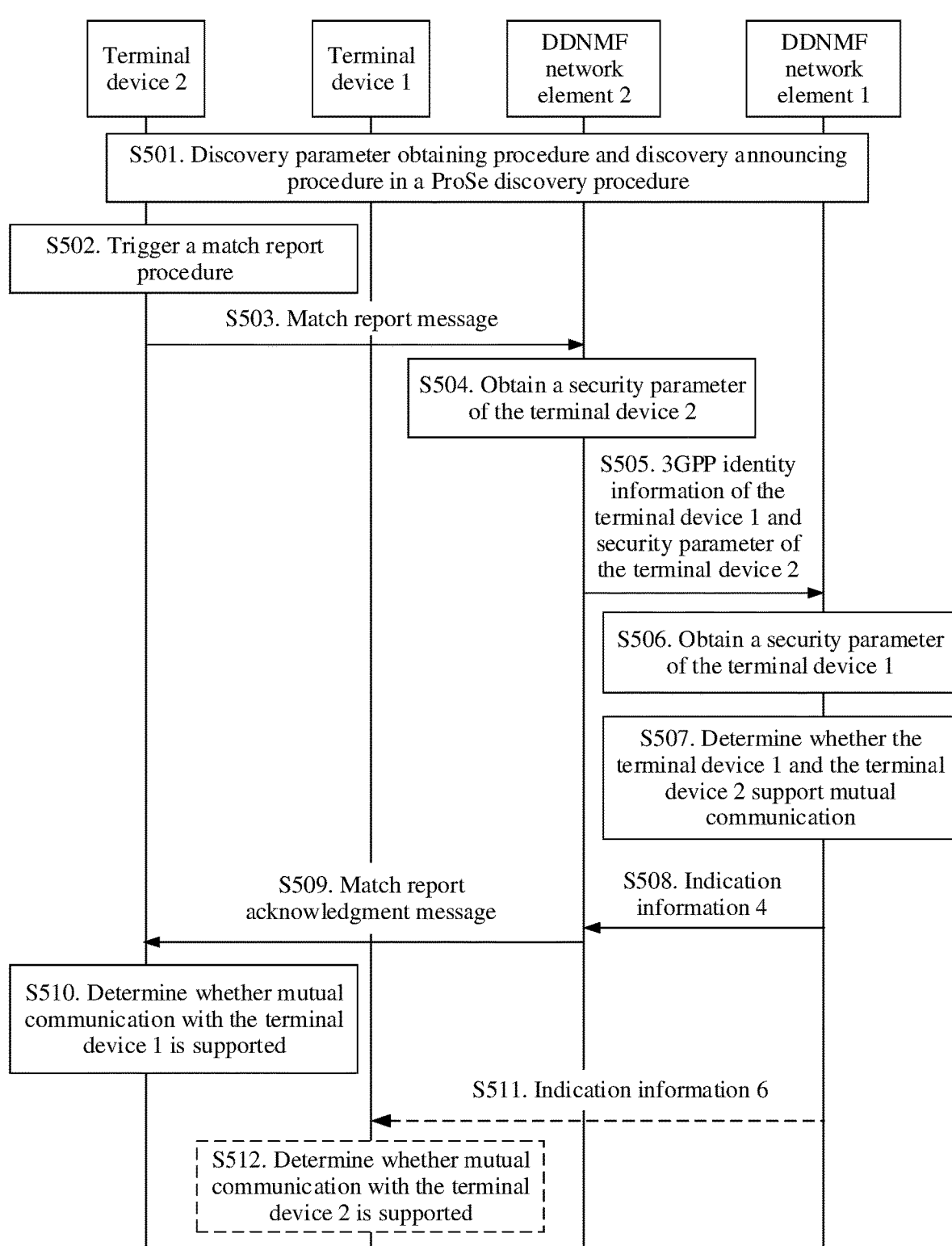
FIG. 5 is a schematic interaction diagram of another communication method according to an embodiment of the present disclosure.

For example, an embodiment of the present disclosure provides another communication method. In the communication method, the architecture of the ProSe control plane in the 5G network shown in FIG. 2 is used as an example, and security parameter matching depends on a match report procedure in a ProSe discovery procedure instead of a discovery parameter obtaining procedure in the ProSe discovery procedure. In addition, the procedure in this embodiment is applicable to two scenarios: open discovery and restricted discovery. As shown in FIG. 5, the communication method includes the following steps.

S501. For a discovery parameter obtaining procedure and a discovery announcing procedure in a ProSe discovery procedure, refer to an existing 4G ProSe discovery procedure. A terminal device 2 obtains, in the discovery parameter obtaining procedure, a user identity for a ProSe service that corresponds to a terminal device 1, and the terminal device 2 obtains, in the discovery announcing procedure, 3GPP identity information of the terminal device 1 and a code for ProSe discovery.

It should be noted that a ProSe discovery-related function in a ProSe function in a 5G network is replaced with a 5G DDNMF network element (for example, a DDNMF network element 1 and a DDNMF network element 2 in this embodiment).

It should be noted that, in this embodiment, in the discovery parameter obtaining procedure in the ProSe discovery procedure, the terminal device 2 needs to obtain an indication for subsequently triggering a match report.

S502. The terminal device 2 triggers, based on the indication for triggering the match report, a match report procedure after discovering the terminal device 1.

Optionally, the terminal device 2 in this embodiment may be monitoring UE in Model A or discoverer UE in Model B, and the terminal device 1 in this embodiment may be, for example, announcing UE in Model A or discoveree UE in Model B.

S503. The terminal device 2 sends a match report message to the DDNMF network element 2. Correspondingly, the DDNMF network element 2 receives the match report message from the terminal device 2. The match report message includes one or more of the 3GPP identity information of the terminal device 1, 3GPP identity information of the terminal device 2, the user identity for the ProSe service that corresponds to the terminal device 1, a user identity for a ProSe service that corresponds to the terminal device 2, a discovery mode, a discovery command, a discovery type, and an application identifier (application ID). For related descriptions of the 3GPP identity information of the terminal device 1, the 3GPP identity information of the terminal device 2, the user identity for the ProSe service that corresponds to the terminal device 1, the user identity for the ProSe service that corresponds to the terminal device 2, the discovery mode, the discovery command, the discovery type, and the application identifier, refer to the embodiment shown in FIG. 4A and FIG. 4B.

Optionally, in this embodiment, the terminal device 2 may send the match report message to the DDNMF network element 2 through a user plane; or the terminal device 2 may send the match report message to the DDNMF network element 2 through a control plane. For example, after the terminal device 2 sends the match report message to an AMF network element 2 by using a NAS message, the AMF network element 2 forwards a container and/or a parameter in the NAS message to the DDNMF network element 2. This is not specifically limited in this embodiment. For a manner of transmitting the match report message between the terminal device 2 and the DDNMF network element 2, refer to the embodiment shown in FIG. 1.

Optionally, the match report message in this embodiment may further include a security policy of the terminal device 2. For related descriptions of the security policy, refer to the description part of the preface of the specific embodiments.

Optionally, the match report message in this embodiment may further include a security capability of the terminal device 2. For related descriptions of the security capability, refer to the description part of the preface of the specific embodiments.

S504. The DDNMF network element 2 obtains a security parameter of the terminal device 2. A security parameter is required for establishing a PC5 connection between the terminal device 1 and the terminal device 2.

The security parameter in this embodiment includes the security policy and/or the security capability.

In this embodiment, a manner in which the DDNMF network element 2 obtains the security policy of the terminal device 2 is similar to the manner in which the DDNMF network element 2 obtains the security policy of the terminal device 2 in the embodiment shown in FIG. 4A and FIG. 4B. A difference lies in that, for example, the discovery request 1 or the discovery request 2 in the embodiment shown in FIG. 4A and FIG. 4B is replaced with the match report message in this embodiment.

In this embodiment, a manner in which the DDNMF network element 2 obtains the security capability of the terminal device 2 is similar to the manner in which the DDNMF network element 2 obtains the security capability of the terminal device 2 in the embodiment shown in FIG. 4A and FIG. 4B. A difference lies in that, for example, the discovery request 1 or the discovery request 2 in the embodiment shown in FIG. 4A and FIG. 4B is replaced with the match report message in this embodiment.

S505. The DDNMF network element 2 sends the 3GPP identity information of the terminal device 1 and the security parameter of the terminal device 2 to the DDNMF network element 1 after determining the DDNMF network element 1 corresponding to the terminal device 1. Correspondingly, the DDNMF network element 1 receives the 3GPP identity information of the terminal device 1 and the security parameter of the terminal device 2 from the DDNMF network element 2.

In this embodiment, the DDNMF network element 2 may determine, based on one or more, obtained in step S501, of the 3GPP identity information of the terminal device 1, the code for ProSe discovery, or the user identity for the ProSe service that corresponds to the terminal device 1, the DDNMF network element 1 corresponding to the terminal device 1.

S506. The DDNMF network element 1 obtains a security parameter of the terminal device 1 based on the 3GPP identity information of the terminal device 1.

In this embodiment, after obtaining the 3GPP identity information of the terminal device 1, the DDNMF network element 1 may obtain an SUPI of the terminal device 1 based on the 3GPP identity information of the terminal device 1. A specific obtaining manner is similar to that in FIG. 4A and FIG. 4B, in which the DDNMF network element 1 obtains the SUPI of the terminal device 1 based on the 3GPP identity information of the terminal device 1. Further, a manner in which the DDNMF network element 1 obtains a security policy of the terminal device 1 is the same as the manner in which the DDNMF network element 1 obtains, based on the SUPI of the terminal device 1, the security policy of the terminal device 1 from the PCF network element 1 (or another network element) corresponding to the terminal device 1 in the embodiment shown in FIG. 4A and FIG. 4B.

In this embodiment, the DDNMF network element 1 may interact, using the SUPI of the terminal device 1, with an AMF network element 1 corresponding to the terminal device 1, to obtain a security capability of the terminal device 1. This is not specifically limited in this embodiment.

S507. The DDNMF network element 1 determines, based on whether a security parameter of the terminal device 1 matches a security parameter of the terminal device 2, whether the terminal device 1 and the terminal device 2 support mutual communication.

For a specific implementation of step S507, refer to step S411 in the embodiment shown in FIG. 4A and FIG. 4B. A difference lies in that: in step S411 in the embodiment shown in FIG. 4A and FIG. 4B, the DDNMF network element 2 determines whether the terminal device 1 and the terminal device 2 support mutual communication, but in this embodiment, the DDNMF network element 1 determines whether the terminal device 1 and the terminal device 2 support mutual communication.

Optionally, in this embodiment, if the DDNMF network element 1 determines that the terminal device 1 and the terminal device 2 support mutual communication, the DDNMF network element 1 may further determine a security protection method and a used security protection algorithm for the PC5 connection between the terminal device 1 and the terminal device 2.

S508. The DDNMF network element 1 sends indication information 4 to the DDNMF network element 2. Correspondingly, the DDNMF network element 2 receives the indication information 4 from the DDNMF network element 1. The indication information 4 indicates whether the terminal device 1 and the terminal device 2 support mutual communication.

Optionally, in this embodiment, if the DDNMF network element 1 may determine the security protection method and the used security protection algorithm for the PC5 connection between the terminal device 1 and the terminal device 2, the DDNMF network element 1 may further send the security protection method and the used security protection algorithm for the PC5 connection to the DDNMF network element 2. Correspondingly, the DDNMF network element 2 receives the security protection method and the used security protection algorithm for the PC5 connection from the DDNMF network element 1.

S509. The DDNMF network element 2 sends a match report acknowledgment message to the terminal device 2. Correspondingly, the terminal device 2 receives the match report acknowledgment message from the DDNMF network element 2. The match report acknowledgment message includes indication information 5. The indication information 5 indicates whether the terminal device 1 and the terminal device 2 support mutual communication.

In this embodiment, the indication information 5 may be the same as the indication information 4, or may be a variant of the indication information 4. This is not specifically limited in this embodiment.

Optionally, in this embodiment, if the DDNMF network element 2 may obtain the security protection method and the used security protection algorithm for the PC5 connection, the match report acknowledgment message may further include the security protection method and the used security protection algorithm for the PC5 connection. In this way, in a subsequent PC5 unicast establishment procedure, the terminal device 1 and the terminal device 2 may not need to negotiate the security protection method and the used security protection algorithm for the PC5 connection. This can not only reduce signaling overheads of the PC5 unicast establishment procedure, but also can reduce implementation complexity of the PC5 unicast establishment procedure.

S510. The terminal device 2 determines, based on the indication information 5, whether mutual communication with the terminal device 1 is supported.

In this embodiment, if the terminal device 2 determines, based on the indication information 5, that mutual communication with the terminal device 1 is supported, the terminal device 2 may continue the subsequent PC5 unicast establishment procedure; or if the terminal device 2 determines, based on the indication information 5, that mutual communication with the terminal device 1 is not supported, the terminal device 2 determines not to perform the subsequent PC5 unicast establishment procedure.

Optionally, the communication method provided in this embodiment may further include the following steps S511 and S512.

S511. The DDNMF network element 1 sends indication information 6 to the terminal device 1. Correspondingly, the terminal device 1 receives the indication information 6 from the DDNMF network element 1. The indication information 6 indicates whether the terminal device 1 and the terminal device 2 support mutual communication.

In this embodiment, the indication information 6 may be the same as the indication information 4, or may be a variant of the indication information 4. This is not specifically limited in this embodiment.

Optionally, in this embodiment, if the DDNMF network element 1 may determine the security protection method and the used security protection algorithm for the PC5 connection between the terminal device 1 and the terminal device 2, the DDNMF network element 1 may further send the security protection method and the used security protection algorithm for the PC5 connection to the terminal device 1. Correspondingly, the terminal device 1 receives the security protection method and the used security protection algorithm for the PC5 connection from the DDNMF network element 1. In this way, in the subsequent PC5 unicast establishment procedure, the terminal device 1 and the terminal device 2 may not need to negotiate the security protection method and the used security protection algorithm for the PC5 connection. This can not only reduce signaling overheads of the PC5 unicast establishment procedure, but also can reduce implementation complexity of the PC5 unicast establishment procedure.

S512. The terminal device 1 determines, based on the indication information 6, whether mutual communication with the terminal device 2 is supported.

In this embodiment, if the terminal device 1 determines, based on the indication information 6, that mutual communication with the terminal device 2 is supported, the terminal device 1 may continue the subsequent PC5 unicast establishment procedure; or if the terminal device 1 determines, based on the indication information 6, that mutual communication with the terminal device 2 is not supported, the terminal device 1 determines not to perform the subsequent PC5 unicast establishment procedure, so that the terminal device 1 can release a context of the terminal device 2 that is obtained in the discovery announcing procedure, to reduce storage burden.

Security negotiation is introduced to a PC5 unicast establishment procedure in an existing V2X scenario, and inconsistency between security parameters of terminal devices at two ends leads to a PC5 unicast establishment failure. In this case, because the ProSe discovery procedure is completed, and some steps of the PC5 unicast establishment procedure are also performed, excessive signaling is wasted. In this embodiment, the security parameter of the terminal device 1 may be matched with the security parameter of the terminal device 2 in the ProSe discovery procedure. When the security parameter of the terminal device 1 does not match the security parameter of the terminal device 2, it indicates that the terminal device 1 and the terminal device 2 do not support mutual communication, so that the ProSe discovery procedure between the terminal device 1 and the terminal device 2 can be terminated in time. Therefore, this can avoid a waste of signaling resulting from a PC5 unicast establishment failure due to inconsistency between security parameters of terminal devices at two ends in the PC5 unicast establishment procedure after the ProSe discovery procedure in the conventional technology.

The processor 301 in the communication device 300 shown in FIG. 3 may invoke the application program code stored in the memory 303, to instruct the DDNMF network element 1 or the DDNMF network element 2 to perform an action of the DDNMF network element 1 or the DDNMF network element 2 in steps S501 to S512. This is not limited in this embodiment.

Figure 6:
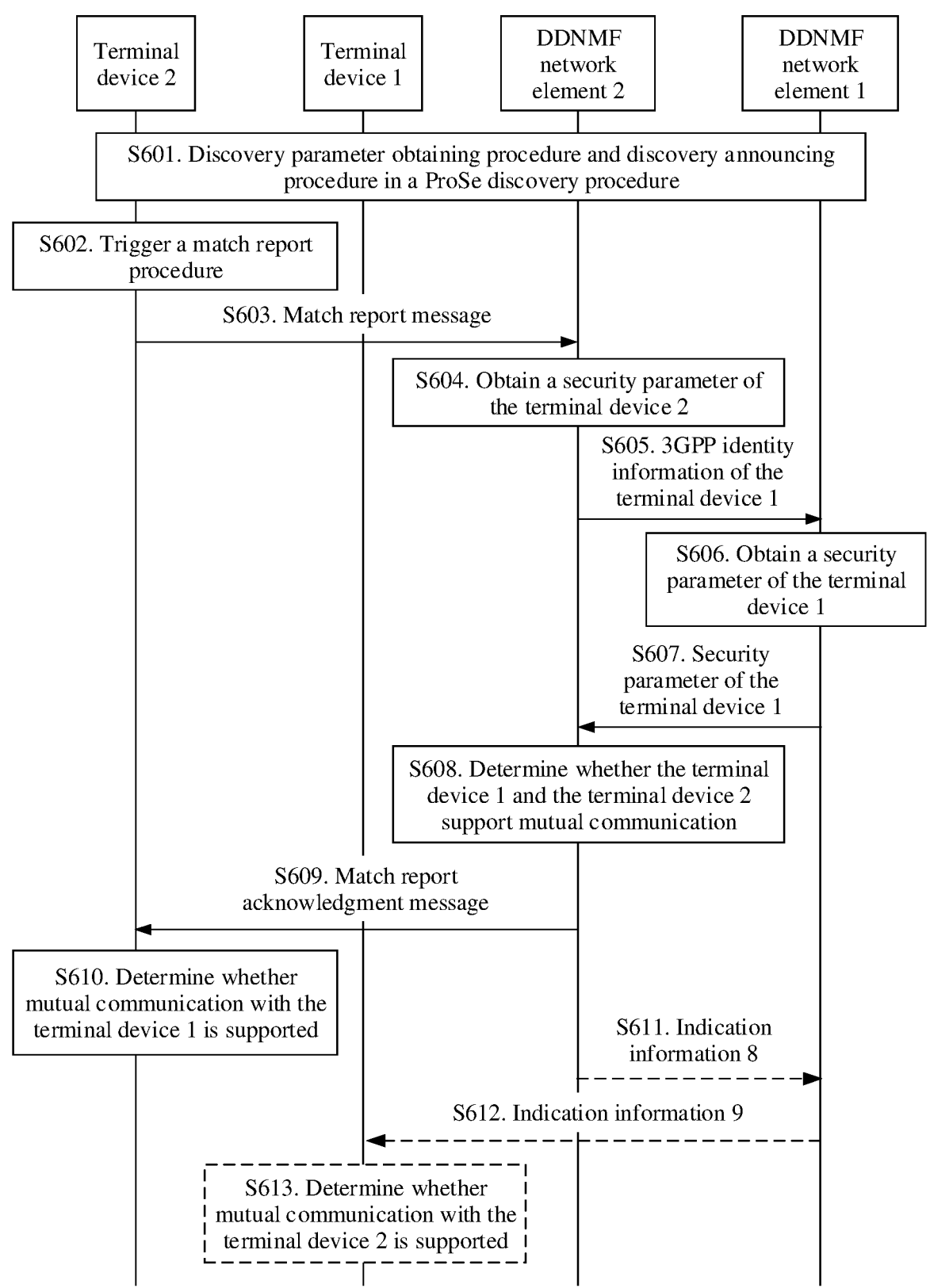
FIG. 6 is a schematic interaction diagram of still another communication method according to an embodiment of the present disclosure.

For example, an embodiment of the present disclosure provides another communication method. In the communication method, the architecture of the ProSe control plane in the 5G network shown in FIG. 2 is used as an example, and security parameter matching depends on a match report procedure in a ProSe discovery procedure instead of a discovery parameter obtaining procedure in the ProSe discovery procedure. In addition, the procedure in this embodiment is applicable to two scenarios: open discovery and restricted discovery. As shown in FIG. 6, the communication method includes the following steps.

S601 to S604 are the same as steps S501 to S504 in the embodiment shown in FIG. 5. For related descriptions, refer to the embodiment shown in FIG. 5.

S605. A DDNMF network element 2 sends a request message to a DDNMF network element 1 after determining the DDNMF network element 1 corresponding to a terminal device 1. Correspondingly, the DDNMF network element 1 receives the request message from the DDNMF network element 2. The request message includes 3GPP identity information of the terminal device 1, and is used to request a security parameter of the terminal device 1.

In this embodiment, for a manner in which the DDNMF network element 2 determines the DDNMF network element 1, refer to the embodiment shown in FIG. 5.

S606. The DDNMF network element 1 obtains the security parameter of the terminal device 1 based on the 3GPP identity information of the terminal device 1.

For a manner in which the DDNMF network element 1 obtains the security parameter of the terminal device 1 based on the 3GPP identity information of the terminal device 1, refer to the embodiment shown in FIG. 5.

S607. The DDNMF network element 1 sends a response message to the DDNMF network element 2. Correspondingly, the DDNMF network element 2 receives the response message from the DDNMF network element 1. The response message includes the security parameter of the terminal device 1.

S608. The DDNMF network element 2 determines, based on whether the security parameter of the terminal device 1 matches a security parameter of a terminal device 2, whether the terminal device 1 and the terminal device 2 support mutual communication.

For a specific implementation of step S608, refer to step S411 in the embodiment shown in FIG. 4A and FIG. 4B.

Optionally, in this embodiment, if the DDNMF network element 2 determines that the terminal device 1 and the terminal device 2 support mutual communication, the DDNMF network element 2 may further determine a security protection method and a used security protection algorithm for a PC5 connection between the terminal device 1 and the terminal device 2.

S609. The DDNMF network element 2 sends a match report acknowledgment message to the terminal device 2. Correspondingly, the terminal device 2 receives the match report acknowledgment message from the DDNMF network element 2. The match report acknowledgment message includes indication information 7. The indication information 7 indicates whether the terminal device 1 and the terminal device 2 support mutual communication.

Optionally, in this embodiment, if the DDNMF network element 2 may obtain the security protection method and the used security protection algorithm for the PC5 connection, the match report acknowledgment message may further include the security protection method and the used security protection algorithm for the PC5 connection. In this way, in a subsequent PC5 unicast establishment procedure, the terminal device 1 and the terminal device 2 may not need to negotiate the security protection method and the used security protection algorithm for the PC5 connection. This can not only reduce signaling overheads of the PC5 unicast establishment procedure, but also can reduce implementation complexity of the PC5 unicast establishment procedure.

S610. The terminal device 2 determines, based on the indication information 7, whether mutual communication with the terminal device 1 is supported.

In this embodiment, if the terminal device 2 determines, based on the indication information 7, that mutual communication with the terminal device 1 is supported, the terminal device 2 may continue the subsequent PC5 unicast establishment procedure; or if the terminal device 2 determines, based on the indication information 7, that mutual communication with the terminal device 1 is not supported, the terminal device 2 determines not to perform the subsequent PC5 unicast establishment procedure.

Optionally, the communication method provided in this embodiment may further include the following steps S611 to S613.

S611. The DDNMF network element 2 sends indication information 8 to the DDNMF network element 1. Correspondingly, the DDNMF network element 2 receives the indication information 8 from the DDNMF network element 1. The indication information 8 indicates whether the terminal device 1 and the terminal device 2 support mutual communication.

In this embodiment, the indication information 8 may be the same as the indication information 7, or may be a variant of the indication information 7. This is not specifically limited in this embodiment.

Optionally, in this embodiment, if the DDNMF network element 2 may determine the security protection method and the used security protection algorithm for the PC5 connection between the terminal device 1 and the terminal device 2, the DDNMF network element 2 may further send the security protection method and the used security protection algorithm for the PC5 connection to the DDNMF network element 1. Correspondingly, the DDNMF network element 1 receives the security protection method and the used security protection algorithm for the PC5 connection from the DDNMF network element 2.

S612. The DDNMF network element 1 sends indication information 9 to the terminal device 1. Correspondingly, the terminal device 1 receives the indication information 9 from the DDNMF network element 1. The indication information 9 indicates whether the terminal device 1 and the terminal device 2 support mutual communication.

In this embodiment, the indication information 9 may be the same as the indication information 8, or may be a variant of the indication information 8. This is not specifically limited in this embodiment.

Optionally, in this embodiment, if the DDNMF network element 1 may obtain the security protection method and the used security protection algorithm for the PC5 connection between the terminal device 1 and the terminal device 2, the DDNMF network element 1 may further send the security protection method and the used security protection algorithm for the PC5 connection to the terminal device 1. Correspondingly, the terminal device 1 receives the security protection method and the used security protection algorithm for the PC5 connection from the DDNMF network element 1.

S613. The terminal device 1 determines, based on the indication information 9, whether mutual communication with the terminal device 2 is supported.

In this embodiment, if the terminal device 1 determines, based on the indication information 9, that mutual communication with the terminal device 2 is supported, the terminal device 1 may continue the subsequent PC5 unicast establishment procedure; or if the terminal device 1 determines, based on the indication information 9, that mutual communication with the terminal device 2 is not supported, the terminal device 1 determines not to perform the subsequent PC5 unicast establishment procedure, so that the terminal device 1 can release a context of the terminal device 2 that is obtained in a discovery announcing procedure, to reduce storage burden.

Security negotiation is introduced to a PC5 unicast establishment procedure in an existing V2X scenario, and inconsistency between security parameters of terminal devices at two ends leads to a PC5 unicast establishment failure. In this case, because a ProSe discovery procedure is completed, and some steps of the PC5 unicast establishment procedure are also performed, excessive signaling is wasted. In this embodiment, the security parameter of the terminal device 1 may be matched with the security parameter of the terminal device 2 in the ProSe discovery procedure. When the security parameter of the terminal device 1 does not match the security parameter of the terminal device 2, it indicates that the terminal device 1 and the terminal device 2 do not support mutual communication, so that the ProSe discovery procedure between the terminal device 1 and the terminal device 2 can be terminated in time. Therefore, this can avoid a waste of signaling resulting from a PC5 unicast establishment failure due to inconsistency between security parameters of terminal devices at two ends in the PC5 unicast establishment procedure after the ProSe discovery procedure in the conventional technology.

The processor 301 in the communication device 300 shown in FIG. 3 may invoke the application program code stored in the memory 303, to instruct the DDNMF network element 1 or the DDNMF network element 2 to perform an action of the DDNMF network element 1 or the DDNMF network element 2 in steps S601 to S613. This is not limited in this embodiment.

FIG. 7 shows a communication method according to an embodiment of the present disclosure. The method includes the following steps.

S701. A first direct communication discovery name management function network element obtains a security parameter of a first terminal device. A security parameter is required for establishing a PC5 connection between the first terminal device and a second terminal device.

S702. The first direct communication discovery name management function network element receives a security parameter of the second terminal device from a second direct communication discovery name management function network element.

S703. The first direct communication discovery name management function network element determines, based on whether the security parameter of the first terminal device matches the security parameter of the second terminal device, whether the first terminal device and the second terminal device support mutual communication.

For the foregoing steps S701 to S703:

The first direct communication discovery name management function network element may be, for example, the DDNMF network element 1 in FIG. 4A and FIG. 4B, the first terminal device may be, for example, the terminal device 1 in FIG. 4A and FIG. 4B, the second direct communication discovery name management function network element may be, for example, the DDNMF network element 2 in FIG. 4A and FIG. 4B, and the second terminal device may be, for example, the terminal device 2 in FIG. 4A and FIG. 4B.

Alternatively, the first direct communication discovery name management function network element may be, for example, the DDNMF network element 2 in FIG. 4A and FIG. 4B, the first terminal device may be, for example, the terminal device 2 in FIG. 4A and FIG. 4B, the second direct communication discovery name management function network element may be, for example, the DDNMF network element 1 in FIG. 4A and FIG. 4B, and the second terminal device may be, for example, the terminal device 1 in FIG. 4A and FIG. 4B.

Alternatively, the first direct communication discovery name management function network element may be, for example, the DDNMF network element 1 in FIG. 5, the first terminal device may be, for example, the terminal device 1 in FIG. 5, the second direct communication discovery name management function network element may be, for example, the DDNMF network element 2 in FIG. 5, and the second terminal device may be, for example, the terminal device 2 in FIG. 5.

Alternatively, the first direct communication discovery name management function network element may be, for example, the DDNMF network element 2 in FIG. 6, the first terminal device may be, for example, the terminal device 2 in FIG. 6, the second direct communication discovery name management function network element may be, for example, the DDNMF network element 1 in FIG. 6, and the second terminal device may be, for example, the terminal device 1 in FIG. 6.

For specific implementation of the embodiment shown in FIG. 7, refer to any one of the embodiments shown in FIG. 4A and FIG. 4B to FIG. 6. Security negotiation is introduced to a PC5 unicast establishment procedure in an existing V2X scenario, and inconsistency between security parameters of terminal devices at two ends leads to a PC5 unicast establishment failure. In this case, because a ProSe discovery procedure is completed, and some steps of the PC5 unicast establishment procedure are also performed, excessive signaling is wasted. In this embodiment, matching may be performed between the security parameter of the first terminal device and the security parameter of the second terminal device in the ProSe discovery procedure, and whether the first terminal device and the second terminal device support mutual communication is determined based on whether the security parameter of the first terminal device matches the security parameter of the second terminal device. Further, if the first terminal device and the second terminal device do not support mutual communication, the current ProSe discovery procedure may be terminated in time. Therefore, this can avoid a waste of signaling resulting from a PC5 unicast establishment failure due to inconsistency between security parameters of terminal devices at two ends in the PC5 unicast establishment procedure after the ProSe discovery procedure in the conventional technology.

The processor 301 in the communication device 300 shown in FIG. 3 may invoke the application program code stored in the memory 303, to instruct the first direct communication discovery name management function network element to perform an action of the first direct communication discovery name management function network element in steps S701 to S703. This is not limited in this embodiment.

It may be understood that, in the embodiment shown in FIG. 7, the method and/or the steps implemented by the first direct communication discovery name management function network element may also be implemented by a component (for example, a chip or a circuit) that can be used in the first direct communication discovery name management function network element.

The foregoing mainly describes the solutions provided in embodiments of the present disclosure from the perspective of interaction between the network elements. Correspondingly, an embodiment of the present disclosure further provides a communication apparatus. The communication apparatus may be the first direct communication discovery name management function network element in the foregoing method embodiments, an apparatus including the foregoing first direct communication discovery name management function network element, or a component that can be used in the first direct communication discovery name management function network element. It may be understood that, to implement the foregoing functions, the communication apparatus includes a hardware structure and/or a software module for performing a corresponding function. A person skilled in the art should be easily aware that, with reference to units and algorithm steps in the examples described in embodiments disclosed in this specification, the present disclosure can be implemented in a form of hardware or a combination of hardware and computer software. Whether a function is performed by hardware or hardware driven by computer software depends on particular applications and design constraints of the technical solutions. A person skilled in the art may use different methods to implement the described functions for each particular application, but it should not be considered that the implementation goes beyond the scope of the present disclosure.

FIG. 8 is a schematic diagram of a structure of a communication apparatus 80. The communication apparatus 80 includes a transceiver module 801 and a processing module 802. The transceiver module 801 may also be referred to as a transceiver unit, configured to implement sending and receiving functions. For example, the transceiver module 801 may be a transceiver circuit, a transceiver machine, a transceiver, or a communication interface.

For example, the communication apparatus 80 is the first direct communication discovery name management function network element in the foregoing method embodiments, or a chip or another component disposed in the first direct communication discovery name management function network element. In a possible implementation, the processing module 802 is configured to obtain a security parameter of a first terminal device. A security parameter is required for establishing a PC5 connection between the first terminal device and a second terminal device. The transceiver module 801 is configured to receive a security parameter of the second terminal device from a second direct communication discovery name management function network element. The processing module 802 is further configured to determine, based on whether the security parameter of the first terminal device matches the security parameter of the second terminal device, whether the first terminal device and the second terminal device support mutual communication.

Optionally, that the processing module 802 is configured to determine, based on whether the security parameter of the first terminal device matches the security parameter of the second terminal device, whether the first terminal device and the second terminal device support mutual communication includes: the processing module is configured to: when the security parameter of the first terminal device does not match the security parameter of the second terminal device, determine that the first terminal device and the second terminal device do not support mutual communication.

Optionally, the transceiver module 801 is further configured to send first indication information indicating that the first terminal device and the second terminal device do not support mutual communication.

Optionally, that the processing module 802 is configured to determine, based on whether the security parameter of the first first terminal device matches the security parameter of the second terminal device, whether the first terminal device and the second terminal device support mutual communication includes: the processing module is configured to: when the security parameter of the first terminal device matches the security parameter of the second terminal device, determine that the first terminal device and the second terminal device support mutual communication.

Optionally, the transceiver module 801 is further configured to send second indication information indicating that the first terminal device and the second terminal device support mutual communication.

Optionally, the transceiver module 801 is further configured to send a discovery response to the first terminal device. The discovery response includes a discovery parameter for service discovery.

Optionally, the transceiver module 801 is further configured to send the security parameter of the first terminal device to the first terminal device.

Optionally, the security parameter includes a security capability. That the processing module 802 is configured to obtain a security parameter of a first terminal device includes: the processing module is configured to receive, by using the transceiver module 801, the security capability of the first terminal device from a corresponding mobility management network element; or the processing module is configured to receive, by using the transceiver module 801, the security capability of the first terminal device from the first terminal device.

Optionally, the security parameter includes a security policy. That the processing module 802 is configured to obtain a security parameter of a first terminal device includes: the processing module is configured to receive, by using the transceiver module 801, the security policy of the first terminal device from the first terminal device; the processing module is configured to obtain, by using the transceiver module 801, the security policy of the first terminal device from a corresponding policy control network element; or the processing module is configured to obtain, by using the transceiver module 801, the security policy of the first terminal device from a corresponding unified data management network element.

All related content of the steps in the foregoing method embodiments may be cited in function descriptions of the corresponding functional modules.

In embodiments, the communication apparatus 80 is presented in a form of functional modules obtained through division in an integrated manner. The "module" herein may be a specific ASIC, a circuit, a processor that executes one or more software or firmware programs, a memory, an integrated logic circuit, and/or another device that can provide the foregoing function. In a simple embodiment, a person skilled in the art may figure out that the communication apparatus 80 may be in a form of the communication device 300 shown in FIG. 3.

For example, the processor 301 in the communication device 300 shown in FIG. 3 may invoke computer-executable instructions stored in the memory 303, to enable the communication device 300 to perform the communication method in the foregoing method embodiments.

Specifically, functions/implementation processes of the transceiver module 801 and the processing module 802 in FIG. 8 may be implemented by the processor 301 in the communication device 300 shown in FIG. 3 by invoking the computer-executable instructions stored in the memory 303. Alternatively, a function/an implementation process of the processing module 802 in FIG. 8 may be implemented by the processor 301 in the communication device 300 shown in FIG. 3 by invoking the computer-executable instructions stored in the memory 303, and a function/an implementation process of the transceiver module 801 in FIG. 8 may be implemented through the communication interface 304 in the communication device 300 shown in FIG. 3.

The communication apparatus 80 provided in this embodiment can perform the foregoing communication method. Therefore, for technical effects that can be achieved by the communication apparatus 80, refer to the foregoing method embodiments.

It should be noted that one or more of the foregoing modules or units may be implemented by software, hardware, or a combination thereof. When any one of the foregoing modules or units is implemented by software, the software exists in a form of computer program instructions, and is stored in the memory. The processor may be configured to execute the program instructions and implement the foregoing method procedure. The processor may be built into a SoC (system-on-a-chip) or an ASIC, or may be an independent semiconductor chip. In addition to a core for executing software instructions to perform operations or processing, the processor may further include a necessary hardware accelerator, for example, a field programmable gate array (FPGA), a PLD (programmable logic device), or a logic circuit that implements a special-purpose logic operation.

When the foregoing modules or units are implemented by hardware, the hardware may be any one or any combination of a CPU, a microprocessor, a digital signal processing (DSP) chip, a microcontroller unit (MCU), an artificial intelligence processor, an ASIC, a SoC, an FPGA, a PLD, a dedicated digital circuit, a hardware accelerator, or a non-integrated discrete component, and the hardware may run necessary software or does not depend on software to perform the foregoing method procedures.

Optionally, an embodiment of the present disclosure further provides a communication apparatus (for example, the communication apparatus may be a chip or a chip system). The communication apparatus includes a processor, configured to implement the method in any one of the foregoing method embodiments. In a possible implementation, the communication apparatus further includes a memory. The memory is configured to store necessary program instructions and necessary data. The processor may invoke program code stored in the memory, to instruct the communication apparatus to perform the method in any one of the foregoing method embodiments. Certainly, the communication apparatus may not include a memory. When the communication apparatus is a chip system, the communication apparatus may include a chip, or may include a chip and another discrete component. This is not specifically limited in this embodiment.

All or some of the foregoing embodiments may be implemented by software, hardware, firmware, or any combination thereof. When a software program is used to implement embodiments, all or some of embodiments may be implemented in a form of a computer program product. The computer program product includes one or more computer instructions. When the computer program instructions are loaded and executed on a computer, all or some of the procedures or functions according to embodiments of the present disclosure are generated. The computer may be a general-purpose computer, a dedicated computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid-state drive (SSD)).

Although the present disclosure is described with reference to embodiments, in a process of implementing the present disclosure that claims protection, a person skilled in the art may understand and implement another variation of the disclosed embodiments by viewing the accompanying drawings, disclosed content, and appended claims. In the claims, "comprising" does not exclude another component or another step, and "a" or "one" does not exclude a case of a plurality. A single processor or another unit may implement several functions enumerated in the claims. Some measures are recorded in dependent claims that are different from each other, but this does not mean that these measures cannot be combined to produce a better effect.

Although the present disclosure is described with reference to specific features and embodiments thereof, it is clear that various modifications and combinations may be made to them without departing from the spirit and scope of the present disclosure. Correspondingly, the specification and accompanying drawings are merely example descriptions of the present disclosure defined by the appended claims, and are considered as any of or all modifications, variations, combinations or equivalents that cover the scope of the present disclosure. It is clearly that a person skilled in the art can make various modifications and variations to the present disclosure without departing from the spirit and scope of the present disclosure. The present disclosure is intended to cover these modifications and variations of the present disclosure provided that they fall within the scope of the claims of the present disclosure and their equivalent technologies.

What is claimed is:

1. A communication method, comprising:

obtaining, by a first direct communication discovery name management function network element, a security parameter of a first terminal device;

receiving, by the first direct communication discovery name management function network element, a security parameter of a second terminal device from a second direct communication discovery name management function network element; and determining, by the first direct communication discovery name management function network element based on whether the security parameter of the first terminal device matches the security parameter of the second terminal device, whether the first terminal device and the second terminal device support mutual communication, wherein the security parameter of the first terminal device is required for establishing a PC5 connection between the first terminal device and the second terminal device, and the security parameter of the second terminal device comprises one or more protection algorithms supported by the second terminal device in the PC5 connection.

2. The method according to claim 1, wherein the determining, by the first direct communication discovery name management function network element based on whether the security parameter of the first terminal device matches the security parameter of the second terminal device, whether the first terminal device and the second terminal device support mutual communication comprises:

when the security parameter of the first terminal device does not match the security parameter of the second terminal device, determining, by the first direct communication discovery name management function network element, that the first terminal device and the second terminal device do not support mutual communication.

3. The method according to claim 2, further comprising:

sending, by the first direct communication discovery name management function network element, indication information indicating that the first terminal device and the second terminal device do not support mutual communication.

4. The method according to claim 1, wherein the determining, by the first direct communication discovery name management function network element based on whether the security parameter of the first terminal device matches the security parameter of the second terminal device, whether the first terminal device and the second terminal device support mutual communication comprises:

when the security parameter of the first terminal device matches the security parameter of the second terminal device, determining, by the first direct communication discovery name management function network element, that the first terminal device and the second terminal device support mutual communication.

5. The method according to claim 4, further comprising:

sending, by the first direct communication discovery name management function network element, indication information indicating that the first terminal device and the second terminal device support mutual communication.

6. The method according to claim 4, further comprising:

sending, by the first direct communication discovery name management function network element, a discovery response to the first terminal device, wherein the discovery response comprises a discovery parameter for service discovery.

7. The method according to claim 1, further comprising:

sending, by the first direct communication discovery name management function network element, the security parameter of the first terminal device to the first terminal device.

8. The method according to claim 1, wherein the security parameter of the first terminal device includes a protection algorithm for establishing the PC5 connection, and the method further comprises:

determining whether the security parameter of the first terminal device matches the security parameter of the second terminal device by determining whether the one or more protection algorithms supported by the second terminal device include the protection algorithm for establishing the PC5 connection.

9. A first direct communication discovery name management function network element, comprising a processor coupled to a memory storing instructions and configured to execute the instructions to cause the first direct communication discovery name management function network element to:

obtain a security parameter of a first terminal device;

receive a security parameter of a second terminal device from a second direct communication discovery name management function network element;

and determine, based on whether the security parameter of the first terminal device matches the security parameter of the second terminal device, whether the first terminal device and the second terminal device support mutual communication, wherein the security parameter of the first terminal device is required for establishing a PC5 connection between the first terminal device and the second terminal device, and the security parameter of the second terminal device comprises one or more protection algorithms supported by the second terminal device in the PC5 connection.

10. The first direct communication discovery name management function network element according to claim 9, wherein the instructions cause the first direct communication discovery name management function network element to determine whether the first terminal device and the second terminal device support mutual communication by:

determining, by the first direct communication discovery name management function network element when the security parameter of the first terminal device does not match the security parameter of the second terminal device, that the first terminal device and the second terminal device do not support mutual communication.

11. The first direct communication discovery name management function network element according to claim 10, wherein the instructions further cause the first direct communication discovery name management function network element to send indication information indicating that the first terminal device and the second terminal device do not support mutual communication.

12. The first direct communication discovery name management function network element according to claim 9, wherein the instructions cause the first direct communication discovery name management function network element to determine whether the first terminal device and the second terminal device support mutual communication by:

determining, by the first direct communication discovery name management function network element when the security parameter of the first terminal device matches the security parameter of the second terminal device, that the first terminal device and the second terminal device support mutual communication.

13. The first direct communication discovery name management function network element according to claim 12, wherein the instructions further cause the first direct communication discovery name management function network element to send indication information indicating that the first terminal device and the second terminal device support mutual communication.

14. The first direct communication discovery name management function network element according to claim 12, wherein the instructions further cause the first direct communication discovery name management function network element to send a discovery response to the first terminal device, wherein the discovery response comprises a discovery parameter for service discovery.

15. The first direct communication discovery name management function network element according to claim 9, wherein the instructions further cause the first direct communication discovery name management function network element to send the security parameter of the first terminal device to the first terminal device.

16. The first direct communication discovery name management function network element according to claim 9, wherein the security parameter of the first terminal device includes a protection algorithm for establishing the PC5 connection, and the instructions further cause the first direct communication discovery name management function network element to determine whether the security parameter of the first terminal device matches the security parameter of the second terminal device by determining whether the one or more protection algorithms supported by the second terminal device includes the protection algorithm for establishing the PC5 connection.

17. A non-transitory computer-readable storage medium storing instructions that, when run on an apparatus, cause the apparatus to:

obtain a security parameter of a first terminal device;

receive a security parameter of a second terminal device from a second direct communication discovery name management function network element; and determine, based on whether the security parameter of the first terminal device matches the security parameter of the second terminal device, whether the first terminal device and the second terminal device support mutual communication, wherein the security parameter of the first terminal device is required for establishing a PC5 connection between the first terminal device and the second terminal device, and the security parameter of the second terminal device comprises one or more protection algorithms supported by the second terminal device in the PC5 connection.

18. The non-transitory computer-readable storage medium according to claim 17, wherein the determining whether the first terminal device and the second terminal device support mutual communication comprises:

determining that the first terminal device and the second terminal device support mutual communication when the security parameter of the first terminal device matches the security parameter of the second terminal device.

19. The non-transitory computer-readable storage medium according to claim 18, wherein the instructions, when run on an apparatus, further cause the apparatus to send a discovery response to the first terminal device, wherein the discovery response comprises a discovery parameter for service discovery.

20. The non-transitory computer-readable storage medium according to claim 18, wherein the security parameter of the first terminal device includes a protection algorithm for establishing the PC5 connection, and the instructions, when run on an apparatus, further cause the apparatus to determine whether the security parameter of the first terminal device matches the security parameter of the second terminal device by determining whether the one or more protection algorithms supported by the second terminal device includes the protection algorithm for establishing the PC5 connection.

\* \* \* \* \*